United States Patent
Toda et al.

[11] Patent Number: 6,002,218
[45] Date of Patent: Dec. 14, 1999

[54] CONTROL DEVICE FOR AIR CONDITIONER

[75] Inventors: Koichi Toda, Yokohama; Yoshio Ogawa, Tokyo, both of Japan

[73] Assignee: Fujitsu General Limited, Japan

[21] Appl. No.: 08/257,478

[22] Filed: Jun. 9, 1994

Related U.S. Application Data

[63] Continuation of application No. 08/040,893, Mar. 31, 1993, abandoned.

[30] Foreign Application Priority Data

| Nov. 20, 1992 | [JP] | Japan | 4-335559 |
| Jan. 21, 1993 | [JP] | Japan | 5-026277 |
| Jan. 25, 1993 | [JP] | Japan | 5-028654 |

[51] Int. Cl.⁶ .................................................. H02P 7/00
[52] U.S. Cl. ............................................................ 318/66
[58] Field of Search ............................... 318/34, 41, 44, 318/46, 49, 51, 52, 53, 55, 59, 66, 68, 69, 77, 85, 798–815, 254, 439, 138

[56] References Cited

U.S. PATENT DOCUMENTS

| 3,538,405 | 11/1970 | Borden et al. | 318/801 |
| 3,600,655 | 8/1971 | Karlin et al. | 318/67 |
| 3,940,677 | 2/1976 | Morino et al. | 318/46 X |
| 3,961,232 | 6/1976 | Newell | 318/46 |
| 4,024,444 | 5/1977 | Dewan et al. | 318/805 |
| 4,186,334 | 1/1980 | Hirata | 318/805 |
| 4,196,785 | 4/1980 | Downing | 318/807 X |
| 4,698,744 | 10/1987 | Itani et al. | 318/811 X |
| 4,716,347 | 12/1987 | Fujimoto | 318/432 X |
| 4,724,678 | 2/1988 | Puhl | 62/80 |
| 4,856,286 | 8/1989 | Sulfstede et al. | 318/811 X |
| 4,875,539 | 10/1989 | Abukawa et al. | 318/139 X |
| 4,962,976 | 10/1990 | Takahashi et al. | 318/81 |
| 5,115,172 | 5/1992 | Ishii et al. | 318/38 |
| 5,202,612 | 4/1993 | Yoshida et al. | 318/138 |
| 5,210,684 | 5/1993 | Nam | 318/801 X |
| 5,339,013 | 8/1994 | Nakai et al. | 318/254 |
| 5,373,436 | 12/1994 | Yamaguchi et al. | 318/811 X |

*Primary Examiner*—Anthony Wysocki
*Attorney, Agent, or Firm*—Adams & Wilks

[57] ABSTRACT

A control device for controlling a plurality of motors of an air conditioner comprises a plurality of power circuits each for supplying a corresponding DC voltage to drive a respective motor. Motor driving circuits, each having a plurality of switches, supply the DC voltage from a corresponding power circuit as an AC voltage to windings of the corresponding motor. A rotational position of each corresponding motor is detected, and a position detecting signal is generated dependent thereon. Switch driving circuits, each receptive of a corresponding driving signal, drives the plurality of switches of each corresponding motor driving circuit. A single microcomputer controls the rotation of each of the plurality of motors by generating the plurality of driving signals. Each driving signal is dependent on a respective position detecting signal to drive the plurality of switches of each corresponding motor driving circuit so that the DC voltage from each power circuit is converted and supplied as an AC voltage to the windings depending on the rotational position of each corresponding motor.

17 Claims, 16 Drawing Sheets

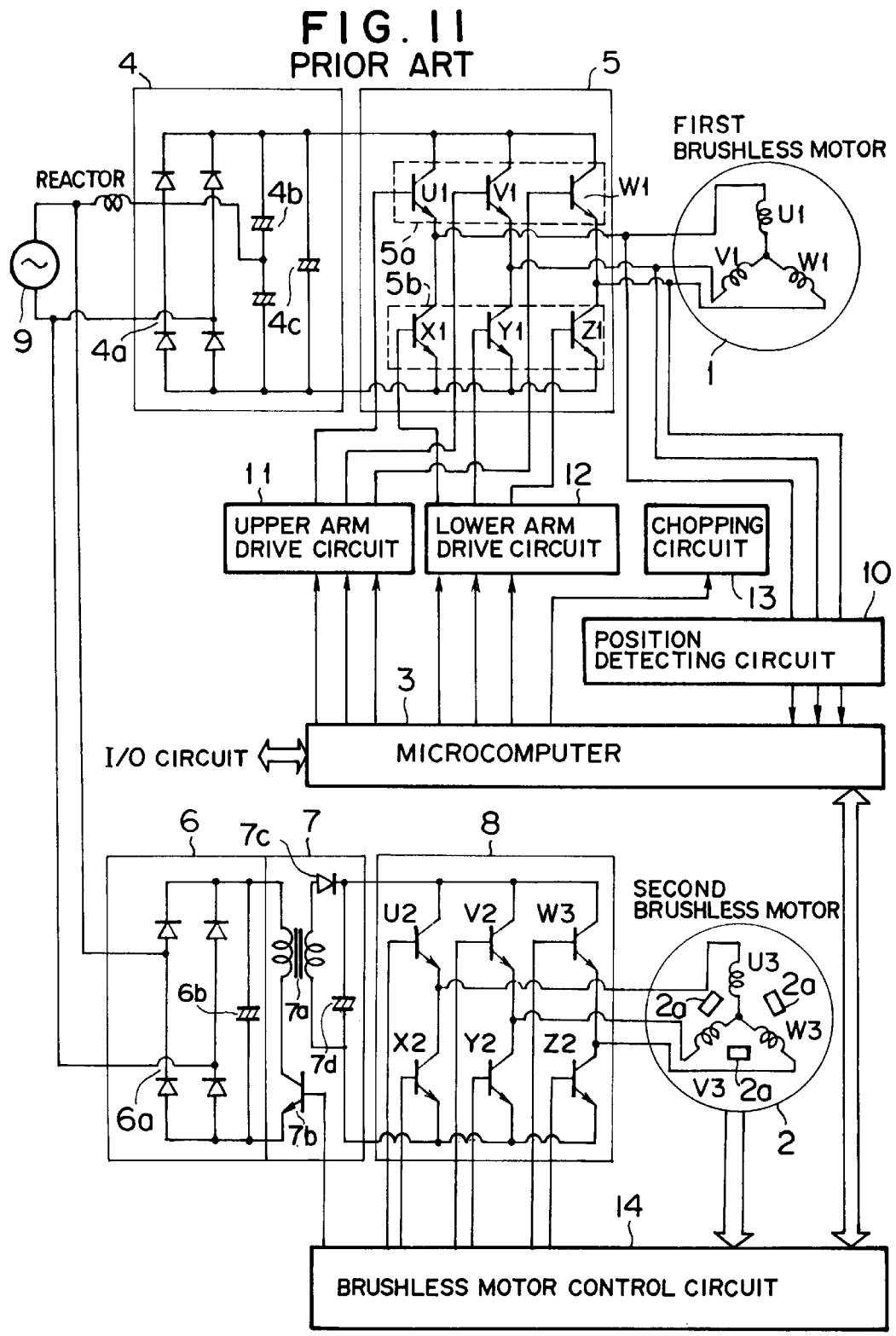

FIG. 12
PRIOR ART

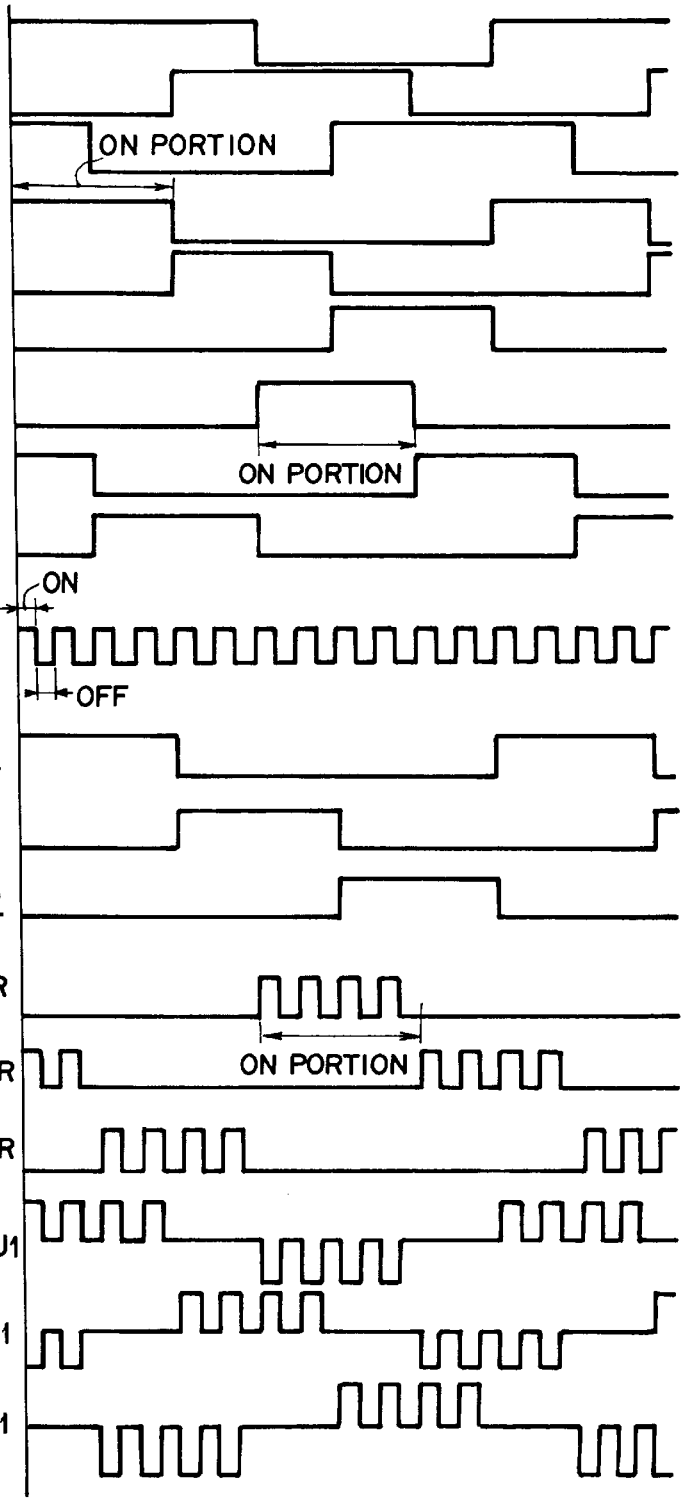

(a) POSITION DETECTING SIGNAL
(b) POSITION DETECTING SIGNAL
(c) POSITION DETECTING SIGNAL
(d) UPPER ARM DRIVE SIGNAL U1
(e) UPPER ARM DRIVE SIGNAL V1
(f) UPPER ARM DRIVE SIGNAL W1
(g) LOWER ARM DRIVE SIGNAL X1
(h) LOWER ARM DRIVE SIGNAL Y1
(i) LOWER ARM DRIVE SIGNAL Z1
(j) CHOPPING SIGNAL
(k) UPPER ARM TRANSISTOR DRIVE CIRCUIT OUTPUT SIGNAL U1
(L) UPPER ARM TRANSISTOR DRIVE CIRCUIT OUTPUT SIGNAL V1
(m) UPPER ARM TRANSISTOR DRIVE CIRCUIT OUTPUT SIGNAL W1
(n) LOWER ARM TRANSISTOR DRIVE CIRCUIT OUTPUT SIGNAL X1
(o) LOWER ARM TRANSISTOR DRIVE CIRCUIT OUTPUT SIGNAL Y1
(p) LOWER ARM TRANSISTOR DRIVE CIRCUIT OUTPUT SIGNAL Z1
(q) ALTERNATING VOLTAGE U1
(r) ALTERNATING VOLTAGE V1
(s) ALTERNATING VOLTAGE W1

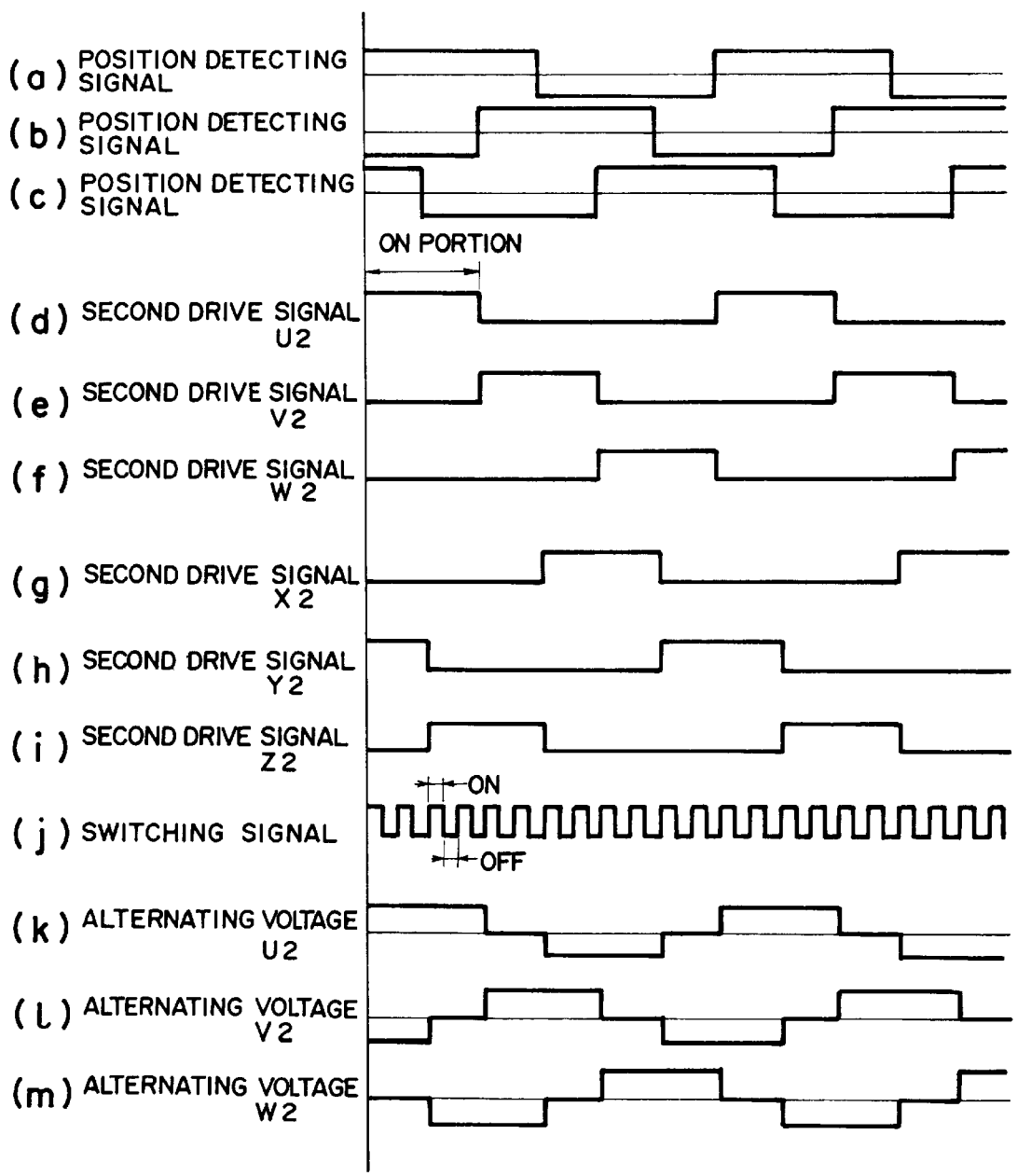

CONTROL DEVICE FOR AIR CONDITIONER

This is a continuation of parent application Ser. No. 08/040,893 filed Mar. 31, 1993, now abandoned.

FIELD OF THE INVENTION

The present invention relates to a control device for an air conditioner having a brushless motor, and more specifically to an air conditioner for controlling a brushless motor for driving a compressor and a blower of the air conditioner, and further more specifically to a control device for an air conditioner in which one of a compressor or a blower is driven by an induction motor while the other is driven by a brushless motor.

DESCRIPTION OF PRIOR ART

An example of a conventional first air conditioner, comprises a first brushless motor 1 (a three-phase brushless motor) for driving a compressor, a second brushless motor 2 (a three-phase brushless motor) for driving a blower, and a microcomputer 3 for performing a predetermined input/output relative to an input/output circuit necessary for the control of an outdoor side of the air conditioner to control the exhaust, as shown in FIG. 11.

In FIG. 11, this air conditioner comprises a first power circuit 4 and a first drive circuit 5 for driving the first brushless motor, and a second power circuit 6, a third power circuit 7 and a second drive circuit 8 for driving the second brushless motor 2.

The first power circuit 4 comprises a commutation circuit 4a, a voltage doubler circuit 4b, a smoothing condenser 4c, and so on. AC power 9 supplied through a reactor is converted into DC power, and a predetermined DC voltage is supplied to the first drive circuit 5. The first drive circuit 5 is composed of an upper arm 5a comprising three transistors U1, V1 and W1 for switching the connection between a positive terminal of the first power circuit 4 and three-phase windings U1, V1 and W1 of the first brushless motor 1, and a lower arm 5b comprising three transistors X1, Y1 and Z1 for switching the connection between the three-phase windings U1, V1 and W1 and a negative terminal of the first power circuit 4.

This air conditioner further comprises a position detecting circuit 10 for detecting a position of a rotor of the first brushless motor 1, an upper arm drive circuit 11, a lower arm drive circuit 12, and a chopping circuit 13. The position detecting circuit 10 comprises, for example, an integrator means and a comparator means, the position detecting circuit 10 being adapted to input terminal voltages of the three-phase windings U1, V1 and W1 of the first brushless motor 1, and to output a position detecting signal for detecting a position of a rotor of the first brushless motor 1.

The microcomputer 3 inputs a position detecting signal (shown in FIGS. 12(a) to 12(c)) from the position detecting circuit 10 to rotate the first brushless motor 1 in response to said position detecting signal, and for that purpose, the microcomputer 3 outputs drive signals U1, V1 and W1, and X1, Y1 and Z1 shown in FIGS. 12(d) to 12(i) to the upper arm drive circuit 11 and the lower arm drive circuit 12 in order to turn on, as desired, the transistors U1, V1 and W1 of the upper arm 5a and the transistors X1, Y1 and Z1 of the lower arm 5b in the first drive circuit 5.

The microcomputer 3 further outputs a chopping signal shown in FIG. 12(j) to the chopping circuit 13. The chopping circuit 13 performs the chopping of the power for the lower arm drive circuit 12 in response to a chopping signal in order to perform the chopping, as desired, of the output signal of the lower arm drive circuit 12, for example, in response to the chopping signal being inputted. Signals X1, Y1 and Z1 by which on-portions of drive signals being inputted as shown in FIGS. 12(n) to 12(p) are outputted from the lower arm drive circuit 12 to the transistors X1, Y1 and Z1 of the lower arm 5b in the first drive circuit 5. The upper arm drive circuit 11 outputs signals U1, V1 and W1 shown in FIGS. 12(k) to 12(m) to the transistors U1, V1 and W1 of the upper arm 5a in the first drive circuit 5 in response to the drive signals being inputted.

The transistors U1, V1, W1, X1, Y1 and Z1 of the upper arm and lower arm in the first drive circuit 5 are turned on as desired by the output signals of the upper arm drive circuit 11 and the lower arm drive circuit 12 to switch the connection between the positive terminal of the first power circuit 4 and the three-phase windings U1, V1 and W1 of the first brushless motor 1. Thereby, the DC voltage from the first power circuit 4 is converted into an AC voltage, which is applied to the three-phase winding of the first brushless motor 1, and at the same time, the chopping drive is effected by the output signal of the lower arm drive circuit 12 when the transistors of the lower arm 5b are turned on. Therefore, AC voltages U1, V1 and W1 subjected to chopping shown in FIGS. 12(q) to 12(s) are applied to the three-phase windings U1, V1 and W1 of the first brushless motor 1.

In the microcomputer 3, the ratio of on to off of a chopping signal outputted to the chopping circuit 13 is varied in order to set the number of revolutions of the first brushless motor to a predetermined number of revolutions. The ratio of on to off of the chopping of AC voltages applied to the three-phase windings U1, V1 and W1 of the first brushless motor 1 is varied, and the applied voltages thereof are varied to control the first brushless motor 1.

On the other hand, the second power circuit 6 comprises a commutation circuit 6a, a smoothing condenser 6b and so on, in which a commercial AC power 9 is converted into a DC power to output a predetermined DC voltage. The third power circuit 7 is a switching power composed of a transformer 7a, a transistor 7b, a diode 7c, a smoothing condenser 7d and so on, in which a DC voltage from the second power circuit 6 is inputted and subjected to switching to convert it into a variable DC voltage, which is supplied to the second drive circuit 8 composed of six transistors U2, V2, W2, X2, Y2 and Z2. The second brushless motor 2 is interiorly provided with a position detecting sensor (a hall element) 2a, which detects a position of a rotor of the second brushless motor 2 to output position detecting signals shown in FIGS. 13(a) to 13(c). A brushless motor control circuit 14 for inputting a position detecting signal from the hall element 2a is composed, for example, of a brushless motor control exclusive use IC and so on. The brushless motor control circuit 14 detects a position of a rotor of the second brushless motor 2 in response to an input position detecting signal to output drive signals U2, V2, W2, X2, Y2 and Z2 shown in FIGS. 13(d) to 13(i) to the transistors U2, V2, W2, X2, Y2 and Z2 of the second drive circuit 8. The transistors of the second drive circuit 8 are turned on as desired by the aforesaid drive signals, and the variable DC voltages from the power circuit 7 to be inputted into the second drive circuit 8 are converted into AC voltages U2, V2 and W2 shown in FIGS. 13(j) to 13(l), which are applied to the three-phase windings U2, V2 and W2 of the second brushless motor 2 to rotate the second brushless motor 2.

The microcomputer 3 further outputs a command of the number of revolutions of the second brushless motor 2. A brushless motor control circuit 14 which inputs the command of the number of revolutions outputs a switching signal for switching-controlling the transistor 7b of a switching power which is the third power circuit 7. (See FIG. 13(m).) The brushless motor control circuit 14 varies the ratio of on to off of the switching signal in response to the command of the number of revolutions inputted, and varies the DC voltage outputted from the third power circuit 7. This variable DC voltage is converted into a variable AC voltage, and applied to the three-phase windings U2, V2 and W2 of the second brushless motor 2. In this manner, the AC voltages applied to the three-phase windings are varied whereby the second brushless motor 2 is variably controlled in speed.

Next, as an example of a conventional second air conditioner, as motors for driving a compressor and a blower, there are used a three-phase induction motor 15 on one hand, and a three-phase brushless motor 12 on the other. In FIG. 14, the same parts as parts corresponding to those shown in FIG. 11 are indicated by the same reference numerals, and a duplicate description is omitted.

In order to rotate the induction motor 15, transistors of a first drive circuit 16 are controlled to output a first drive signal.

In controlling the induction motor 15, the microcomputer 3 obtains, every half-perid Tf of modulation waves shown in FIG. 15, intersections between said modulation waves and fundamental waves U1, V1 and W1, the times Tu1, Tv1 and Tw1 to the intersections shown in FIGS. 15(b), 15(d) and 15(f) on the basis of the thus obtained intersections, and generates and outputs six PWM signals U1, X1, V1, Y1, W1 and Z1 (X1, Y1 and Z1 are reversed signals of U1, V1 and W1) as first drive signals on the basis of the thus obtained Tu1, Tv1 and Tw1 (see FIGS. 15(b) to 15(g)). The first drive signals (PWM signals), U1, X1, V1, Y1, W1 and Z1 outputted from the microcomputer 3 are inputted to a transistor drive circuit 17. The transistor drive circuit 17 turns on and off the six transistors U1, X1, V1, Y1, W1 and Z1 which constitute the first drive circuit 5 in response to the inputted drive signals (PWM signals) U1, X1, V1, Y1, W1 and Z1. The transistors of the first drive circuit 5 are controlled to be turned on and off in response to the first drive signal outputted from the microcomputer 3 whereby DC voltages inputted from the first power circuit 4 into the first drive circuit 5 are converted into three-phase alternating currents U1, V1 and W1, which are applied to three-phase windings U1, V1 and W1 of the induction motor 15 to rotate the induction motor 1. (See FIG. 15(h)).

At this time, in order to set the induction motor 15 to a predetermined number of revolutions, the microcomputer 3 causes the fundamental waves U1, V1 and W1 to have a predetermined crest value and a predetermined frequency according to a predtermined number of revolutions of the induction motor 15 whereby the intersections between the modulation waves and the fundamental waves U1, V1 and W1 are varied and the Tu1, Tv1 and Tw1 are varied. By this variation, pulse widths of the PWM signals U1, X1, V1, Y1, W1 and Z1 as the first drive signals outputted from the microcomputer 3 are varied (said pulse widths being on/off timing). Thereby, a three-phase alternating current supplied from the first drive circuit 5 to the induction motor 15 takes a predetermined voltage and a predetermined frequency, and the induction motor 15 is controlled at a predetermined number of revolutions.

On the other hand, as shown in FIG. 16, in controlling the brushless motor 2, position detecting signals (shown in FIGS. 16(a) to 16(c)) from the internal hall element 11 for detecting a position of a rotor of the brushless motor 2 are supplied to the brushless motor control circuit 12. Then, in the brushless motor control circuit 12, the transistors U2, X2, V2, Y2, W2 and Z2 of the second drive circuit 8 are turned as desired so that the brushless motor 2 may be rotated in response to the thus inputted position detecting signals. Variable DC voltages inputted from the third power circuit 7 to the second drive circuit 8 are converted into three-phase AC voltages U2, V2 and W2, which are applied to the three-phase winding of the brushless motor 2 to rotate the latter. (See FIGS. 16(k) to 16(m)).

In the brushless control circuit 14, a switching signal for switching-controlling a transistor 7b of the third power circuit 7 is outputted (see FIG. 16(j)), and the ratio of on to off of the switching signal is varied in accordance with the command of the number of revolutions of the brushless motor 2. Thereby, an output DC voltage of the third power circuit 7 is varied and inputted into the second drive circuit 8. The thus varied DC voltage is converted into a three-phase AC voltage, a three-phase AC voltage applied to the three-phase winding of the brushless motor 2 is varied, the number of revolutions of the brushless motor 2 is varied, and the brushless motor 2 is controlled on the basis of the command of the number of revolutions from the microcomputer 3.

However, in the above-described control method for the air conditioner, in order to control the motor for driving a compressor and a blower necessary for the air conditioner, two control means, i.e., the microcomputer 3 and the brushless motor control circuit 14 are necessary, and a switching power (the third power circuit 7) for varying and outputting a DC voltage for driving the second brushless motor 2 is also necessary. This complicates the control circuits and the power circuits of the air conditioner and increases the number of parts, resulting in a higher cost and a larger size of the air conditioner.

Moreover, in controlling the brushless motor 2, the ratio of on to off of the switching signal is determined merely by the command of the number of revolutions from the microcomputer 3, and the value of the DC voltage outputted from the switching power (the third power circuit 7) is determined. This leads to a problem in that the number of revolutions of the brushless motor 2 is varied with the variation of loads, and the actual number of revolutions is not in coincidence with the number of revolutions caused by the command of the number of revolutions, namely, the brushless motor 2 is not rotated as determined by the command of the number of revolutions.

SUMMARY OF THE INVENTION

It is an object of the present invention to provide an air conditioner wherein, at least, a control circuit and a power circuit for driving a compressor and a blower of an air conditioner can be simplified. In accordance with the present invention a microcomputer as one control means will suffice to control an air conditioner, and as a consequence of which, the number of parts can be reduced to lower the cost of and increase the miniaturize of the air conditioner. Also, the number of revolutions of a brushless motor can be made constant at a predetermined number of revolutions thereupon even if loads are varied.

According to a first embodiment of the present invention, there is provided a control device for an air conditioner comprising a microcomputer for controlling an air conditioner and a plurality of brushless motors for driving a compressor and a blower of the air conditioner. The control device controlling said plurality of brushless motors, and comprising, with respect to said respective brushless motors, position detecting means for detecting a position of a rotor of a brushless motor to output a position detecting signal, brushless motor drive means composed of a lower arm comprising a plurality of semiconductor switches for switching the connection between a positive terminal of a DC power and a plurality of windings of a brushless motor, drive signal generating means wherein with respect to said brushless motors, a position detecting signal is inputted into said microcomputer. A plurality of semiconductor switches of the brushless motor drive means are turned on as desired so that the brushless motors are rotated in response to said position detecting signal. The connection between a positive terminal and a negative terminal of said DC power and a plurality of windings of the brushless motor is switched, and a DC voltage from the DC power is converted into an AC voltage, which is applied to said plurality of windings to rotate the brushless motors. Chopping signal generating means having a predetermined ratio of on to off wherein with respect to the on-portion of the drive signal turns on as desired a plurality of semiconductor switches constituting at least one arm of an upper arm or a lower arm of said drive means out of the drive signals. The switches are turned on/off at higher frequency than that of the drive signal. Rotation control means is provided wherein a chopping drive signal with the on-portion being a chopping signal and other drive signals are outputted to said microcomputer. The plurality of semiconductor switches of the upper arm and lower arm of said drive means are turned on as desired, at the same time the switch of at least one arm of the upper arm or the lower arm is turned on/off by said chopping signal at the time of turning on. A DC voltage from said DC power is converted into an AC voltage and simultaneously subjected to chopping, and the AC voltage is applied as a predetermined voltage to a plurality of windings of the brushless motor to rotation-control the brushless motor.

According to a second embodiment of the present invention, there is provided a control device for an air conditioner comprising a microcomputer for controlling an air conditioner, an induction motor for controlling one of a compressor or a blower of the air conditioner, and a brushless motor for driving the other. The control device comprises first drive means having a plurality of semiconductor switches, said plurality of switches being turned on/off to thereby convert a DC voltage into an AC voltage, which is supplied to said induction motor. Position detecting means detects a position of a rotor of said brushless motor to output a position detecting signal, and second drive means composed of an upper arm comprising a plurality of semiconductor switches switches the connection between a positive terminal of a DC power and a plurality of windings of said brushless motor. A lower arm comprising a plurality of semiconductor switches switches the connection between a plurality of windings and a negative terminal of said DC power, said microcomputer turning on/off as desired the plurality of switches of said first drive means to output a first drive signal for converting a DC voltage into an AC voltage of a predetermined voltage and a predetermined frequency to rotation-control said induction motor. The microcomputer inputting said position detecting signal, turning on as desired the plurality of switches of the upper arm and the lower arm of said second drive means in response to said position detecting signal to switch the connection between a positive terminal and a negative terminal and the plurality of windings of said brushless motor, and converting a DC voltage caused by said DC power into an AC voltage, which is applied to the plurality of windings to generate a second drive signal for rotating the brushless motor. An on-portion of the drive signal is provided for turning on as desired the plurality of switches of at least one arm out of the upper arm or the lower arm of said second drive signal using as a chopping signal of a predetermined ratio of on to off for turning on/off as desired at higher frequency than that of the drive signal. The plurality of switches of the upper arm and the lower arm of second drive means being turned on as desired by the second drive signal for driving the plurality of switches of the upper arm and the lower arm of said second drive signal, at the same time the plurality of switches being chopping-driven by said chopping signal when the plurality of switches of at least one arm out of the upper arm or the lower arm of the second drive means. A DC voltage caused by said DC power is converted into an AC voltage and at the same time subjected to chopping, and a predetermined AC voltage subjected to chopping is applied to the plurality of winding of said brushless motor to rotation-control the brushless motor.

Further, the microcomputer calculates the number of revolutions of the brushless motor on the basis of the position detecting signal inputted and varies the ratio of on to off of the chopping signal so that the calculated number of revolutions is a predetermined number of revolutions. In controlling the induction motor, the plurality of switches constituting the first drive means are turned on/off as desired by the first drive signal outputted from the microcomputer, a DC voltage is converted into an AC voltage of a predetermined voltage and a predetermined frequency, which is applied to a plurality of winding of the induction motor, and the induction motor is controlled at a predetermined number of revolutions.

Moreover, in controlling the brushless motor, the drive signals for turning on as desired the plurality of switches of the drive means so that the brushless motor is rotated in response to the position detecting signal from the position detecting means of the brushless motor are generated in the microcomputer.

As described above, according to the control device for an air conditioner in accordance with the present invention, since the motor for driving a compressor and a blower necessary for the air conditioner is controlled by the microcomputer likewise necessary for the control of the air conditioner, only the microcomputer is necessary for control means. Further, since a switching power for obtaining a variable DC voltage is not necessary, a control circuit and a power circuit may comprise a simple structure, enabling reduction in the number of parts, lower cost and miniaturization of an air conditioner.

Moreover, since the number of revolutions of a brushless motor is calculated to control the latter to be rotated at a predetermined number of revolutions, the number of revolutions of the brushless motor is not varied due to the variation of loads, and the brushless motor can be controlled constant at a predetermined number of revolutions.

BRIEF DESCRIPTION OF THE DRAWINGS

FIG. 11 is a schematic block diagram of a control circuit for a first conventional air conditioner;

FIG. 12 is a time chart for explaining a control method for a brushless motor used for the air conditioner shown in FIG. 11;

FIG. 16 is a time chart for explaining the operation of a control circuit for the air conditioner shown in FIG. 14.

DESCRIPTION OF THE PREFERRED EMBODIMENTS

Figure 1:
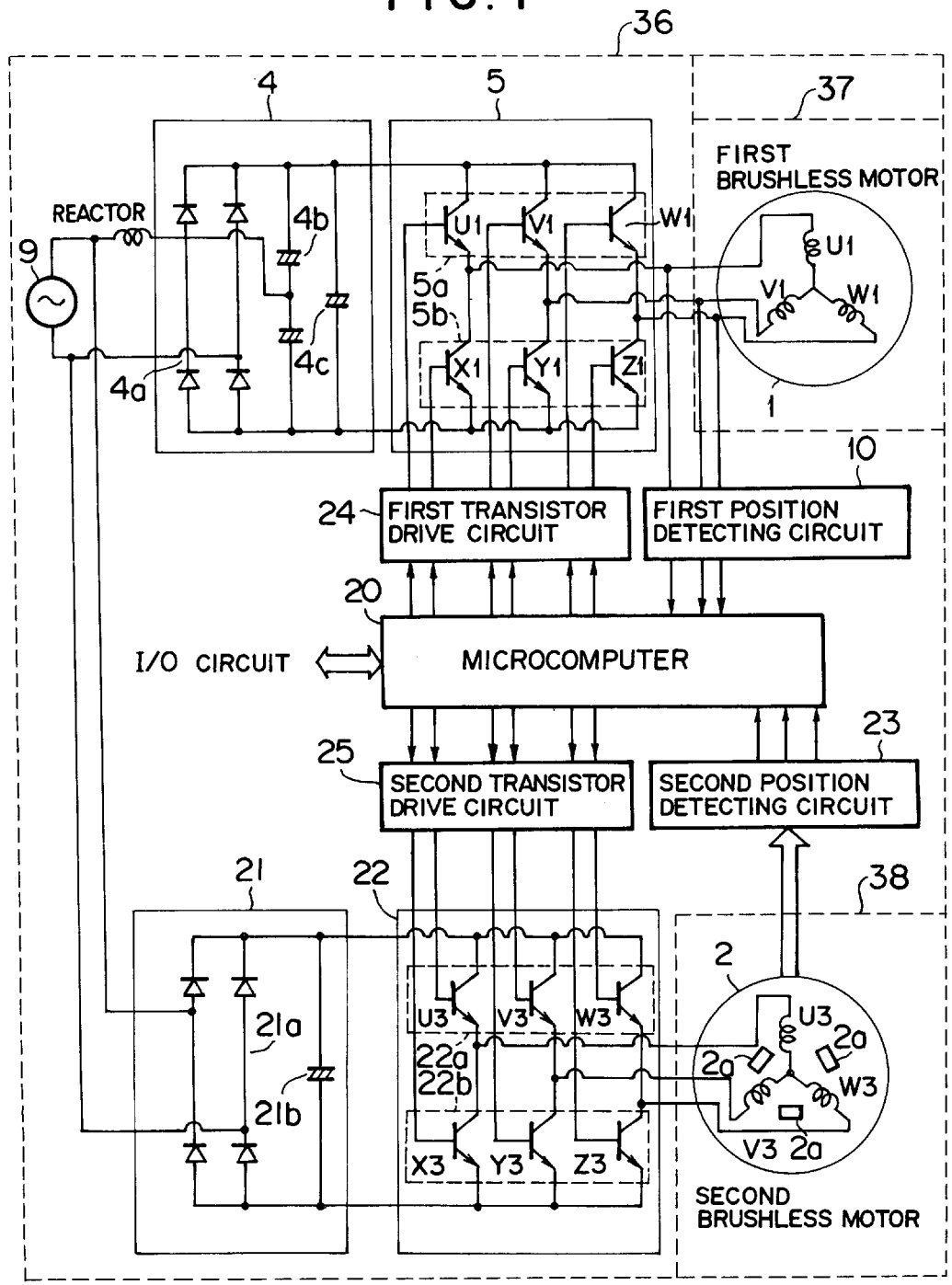
FIG. 1 is a schematic block diagram of a control circuit for an air conditioner showing a first embodiment of the present invention.

A first embodiment of the present invention will be described hereinbelow with reference to FIGS. 1 to 6. It is to be noted that in these drawings, the same parts as and parts corresponding to those shown in FIG. 11 are indicated by the same reference numerals and a duplicate description will be omitted.

Referring to FIG. 1, in a control circuit for an airconditioner 36, three-phase brushless motors are used as first and second brushless motors which are a plurality of brushless motors for driving a compressor 37 and a blower 38 necessary for the air conditioner, the blower is an exhaust blower, and the first and second brushless motors 1 and 2 for driving a compressor and the blower are controlled by a microcomputer 20.

The control circuit for an air conditioner is provided with a second power circuit 21 comprising a commutation circuit 21a for converting a commercial AC power 9 into a DC power and a smoothing condenser 21b, said second power circuit 21 supplying a predetermined DC voltage to a second drive circuit. The second drive circuit 22 is composed of an upper arm 22a comprising three transistors U3, V3 and W3 for switching the connection between a positive terminal of the second power circuit 21 and three-phase windings U3, V3 and W3 of the second brushless motor 2, and a lower arm 22b comprising three transistors X3, Y3 and Z3 for switching the connection between three-phase windings U3, V3 and W3 and a negative terminal of the second power circuit 21.

The control circuit for an air conditioner comprises a second position detecting circuit 23 comprising, for example, comparator means and amplifying means which inputs a signal from a position detecting senser (a hall element) provided interiorly of the second brushless motor 2 and outputs a position detecting signal of a rotor of the second brushless motor 2 to the microcomputer 20.

In FIG. 1, a first transistor drive circuit 24 comprises a combination of an upper arm drive circuit 11 and a lower drive circuit 12 shown in FIG. 11. A second transistor drive circuit 25 has the structure similar to that of the first transistor drive circuit 24.

Figure 2:
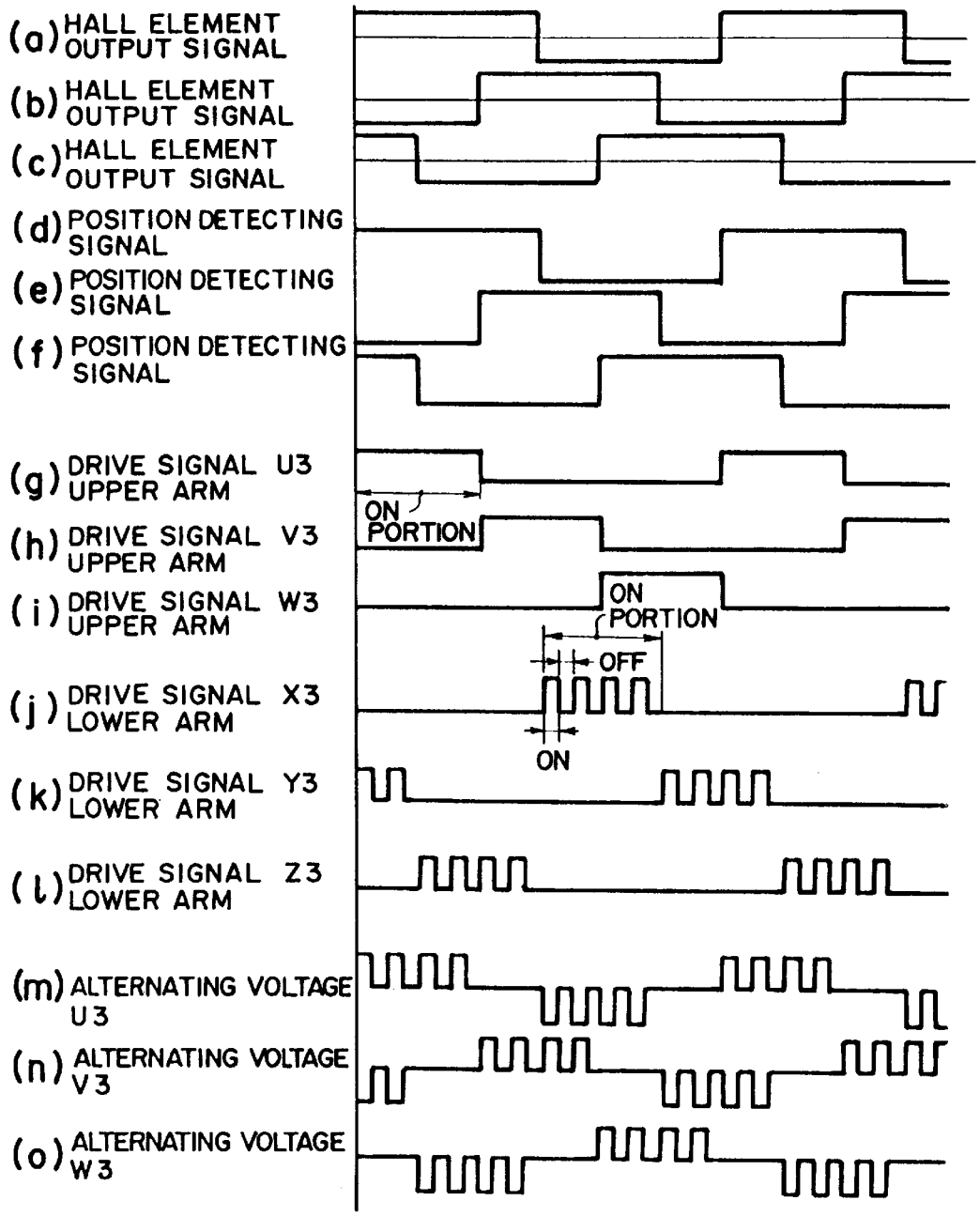
FIG. 2 is a time chart for explaining a control method for a brushless motor used for the air conditioner shown in FIG. 1.

Next, the control method applied to the control circuit for an air conditioner constructed as described above will be described with reference to a time chart shown in FIG. 2 and a flow chart shown in FIG. 3.

Output signals are inputted into the second position detecting circuit 23 (shown in FIGS. 2(a) to 2(c)) from hall elements 2a interiorly of the second brushless motor 2 for detecting a position of a rotor of the second brushless motor 2, and position of defecting signals are outputted from the second position detecting circuit 23 as shown in FIGS. 2(d) and 2(f).

The microcomputer 20 inputs the position detecting signals, turns on as desired the transistors U3, V3, W3, X3, Y3 and Z3 of the second drive circuit 22 so that the second brushless motor 2 is rotated in response to the position detecting signals, switches the connection between a positive terminal and a negative terminal of the second power circuit 21 and the three-phase windings U3, V3 and W3 of the second brushless motor 2, converts a DC voltage from the second power circuit 21 into an AC voltage from the second power circuit 21 to apply it to the three-phase windings U3, V3 and W3, and generates drive signals U3, V3, W3, X3, Y3 and Z3 for rotating the second brushless motor 2 within the microcomputer 20.

At this time, in the microcomputer 20, on-portions of the drive signals for turning on as desired the transistors X3, Y3 and Z3 of at least one arm of the upper arm 22a or the lower arm 22b, for example, the lower arm 22b of the generated drive signals are formed into chopping signals having a predetermined ratio of on to off for turning on/off the transistors X3, Y3 and Z3 of the lower arm 22b at a higher frequency than that of the drive signals within the microcomputer 20, and drive signals X3, Y3 and Z3 (shown in FIGS. 2(j) to 2(l)) in which the on-portions are formed into the chopping signals and other drive signals (shown in FIGS. 2(g) to 2(i)) are outputted from the computer 20.

The transistors U3, V3, W3, X3, Y3 and Z3 of the second drive circuit 22 are turned on as desired by the drive signals U3, V3, W3, X3, Y3 and Z3 outputted from the microcomputer 20 through the second transistor drive circuit 25, and at the same the transistors X3, Y3 and Z3 of the lower arm 22b are turned on/off by the chopping signals of the drive signals when the transistors X3, Y3 and Z3 are turned on.

Thereby, a DC voltage from the second power circuit 21 is converted into an AC voltage and simultaneously subjected to chopping so that the AC voltage is formed into a predetermined voltage. AC voltages U3, V3 and W3 shown in FIGS. 2(m) to 2(o) are applied to three-phase windings U3, V3 and W3 of the second brushless motor 2 for rotation-control of the second brushless motor 2.

On the other hand, the first brushless motor 1 is also controlled in rotation in the manner similar to the above by the microcomputer 20. The microcomputer 20 inputs position detecting signals outputted from the first position detecting circuit 10. Drive signals U1, V1, W1, X1, Y1 and Z1 for turning on as desired the transistors U1, V1, W1, X1, Y1 and Z1 of the first drive circuit 5 are generated within the microcomputer 20 so that the first brushless motor 1 is rotated in response to the position detecting signal.

Out of the thus generated drive signals U1, V1, W1, X1, Y1 and Z1, on-portions of the drive signals X1, Y1 and Z1 for turning on as desired the transistors X1, Y1 and Z1 of at least one arm, for example, the lower arm 5b of the upper arm 5a or the lower arm 5b of the first drive circuit 5 are formed into chopping signals having a predetermined ratio of on to off for turning on/off the transistors X1, Y1 and Z1 at a higher frequency than that of the drive signals within the microcomputer 20, and these drive signals U1, V1, W1, X1, Y1 and Z1 are outputted from the microcomputer 20.

The transistors U1, V1, W1, X1, Y1 and Z1 of the first drive circuit 5 are turned on as desired by the thus outputted drive signals U1, V1, W1, X1, Y1 and Z1 through the first drive circuit 24, and at the same time, the transistors X1, Y1 and Z1 are subjected to chopping when said transistors are turned on. Thereby, AC voltages U1, V1 and W1 in which DC voltages from the first power circuit 4 are converted and at the same time subjected to chopping are applied to the three-phase windings U1, V1 and W1 of the first brushless motor 1 for rotation control of the first brushless motor.

While in the above-described embodiment, the on-portions of the drive signals for driving the transistors of the lower arms 5b and 22b of the first and second drive circuits 5 and 22 are formed into the chopping signals, it is to be noted that the mode thereof is not limited to the above but on-portions of the drive signals of the transistors of the upper arms 5a and 22a may be formed into chopping signals or on-portions of the drive signals of both transistors of the lower arms 5b and 22 may be formed into chopping signals.

The position detecting means of the first and second brushless motors are not limited to those shown in the above-described embodiment but other means may be employed as long as they are means for detecting a position of a rotor of the first and second brushless motors to output position detecting signals. For example, integration means and comparator means which constitute the first position detecting means 10 may be provided interiorly of the microcomputer 20 so that terminal voltages are inputted as position detecting signals into the microcomputer 20. In this case, the three-phase windings U1, V1 and W1 of the first brushless motor 1 comprise the position detecting means.

Alternatively, integration means and amplification means which constitute the second position detecting circuit 23 may be provided interiorly of the microcomputer 20 so that hall elements (the position detecting sensors 2a) are used as position detecting means and output signals thereof are inputted as position detecting signals into the microcomputer 20. Alternatively, the hall element 2a and the hall IC provided with the second position detecting circuit 23 may be used as second position detecting means and output signals thereof are inputted as position detecting means. Alternatively, the second position detecting means may be made similar to the method of the first position detecting means.

As the DC power for driving the first and second brushless motors 1 and 2, for example, a single DC power (commonly used) will suffice. In this case, the first and second drive circuits 5 and 22 may be connected in parallel on the output side of the first power circuit 4. While in the above embodiment, the blower comprises an outdoor blower, it is to be noted that it may comprise an indoor blower.

Further, while in the above-described embodiment, two brushless motors controlled by the microcomputer 20 have been used, it is to be noted that even one or even more than two brushless motors can be similarly controlled. In case of using more than two brushless motors, the brushless motors for driving, for example, a compressor, an indoor blower and an outdoor blower may be driven by the microcomputer in the method described in the above embodiment.

While in the above-described embodiment, the microcomputer 20 comprises a microcomputer for controlling the outdoor side of the air conditioner, it is to be noted that the microcomputer is not limited thereto but any microcomputer may be used as long as it controls the air conditioner.

The rotation control of the second brushless motor 2 will be described in detail with reference to a flow chart shown in FIG. 3. First, in the microcomputer 20, the number of revolutions of the second brushless motor 2 is calculated on the basis of a position detecting signal inputted through an input port. (Step ST1). This method for calculation of the number of revolutions is carried out by measuring the time between a rise and a fall of three position detecting signals (shown in FIGS. 2(d) to 2(f)) inputted, for example.

Next, the calculated number of revolutions is compared with a predetermined number of revolutions of the second brushless motor 2 so that the calculated number of revolutions assumes a predetermined number of revolutions (Step ST2 and Step ST4). When the calculated number of revolutions is smaller than a predetermined number of revolutions (Step ST2), the on-time of the chopping signals of the on-portions of the drive signals of the transistors of the lower arm 22b constituting the second drive circuit 22 is increased (namely, the off time reduces, and the ratio of on to off varies) (Step ST3) in order to make the number of revolutions of the second brushless motor 2 a predetermined number of revolutions, whereby a predetermined AC voltage applied to the three-phase winding of the second brushless motor 2 is increased and the number of revolutions of the second brushless motor 2 is increased.

On the other hand, when the calculated number of revolutions is larger than a predetermined number of revolutions (Step ST4), the on-time of the chopping signals of the drive signals of the transistors of the lower arm 22b is reduced (namely, the off time increases, and the ratio of on to off varies) (Step ST5) in order to make the number of revolutions of the second brushless motor 2 a predetermined number of revolutions, whereby a predetermined AC voltage applied to the three-phase winding of the second brushless motor 2 is decreased, and the number of revolutions of the second brushless motor 2 is decreased.

By the repetition of the above-described Steps ST1 to ST5, the number of revolutions of the second brushless motor is variably controlled and the second brushless motor is controlled in rotation constant at a predetermined number of revolutions.

The first brushless motor 1 is also controlled in rotation frequency similarly to that of the second brushless motor 2. Accordingly, the first and second brushless motors are controlled in rotation to maintain their frequency constant at a predetermined number of revolutions by the microcomputer 20.

Figure 4:
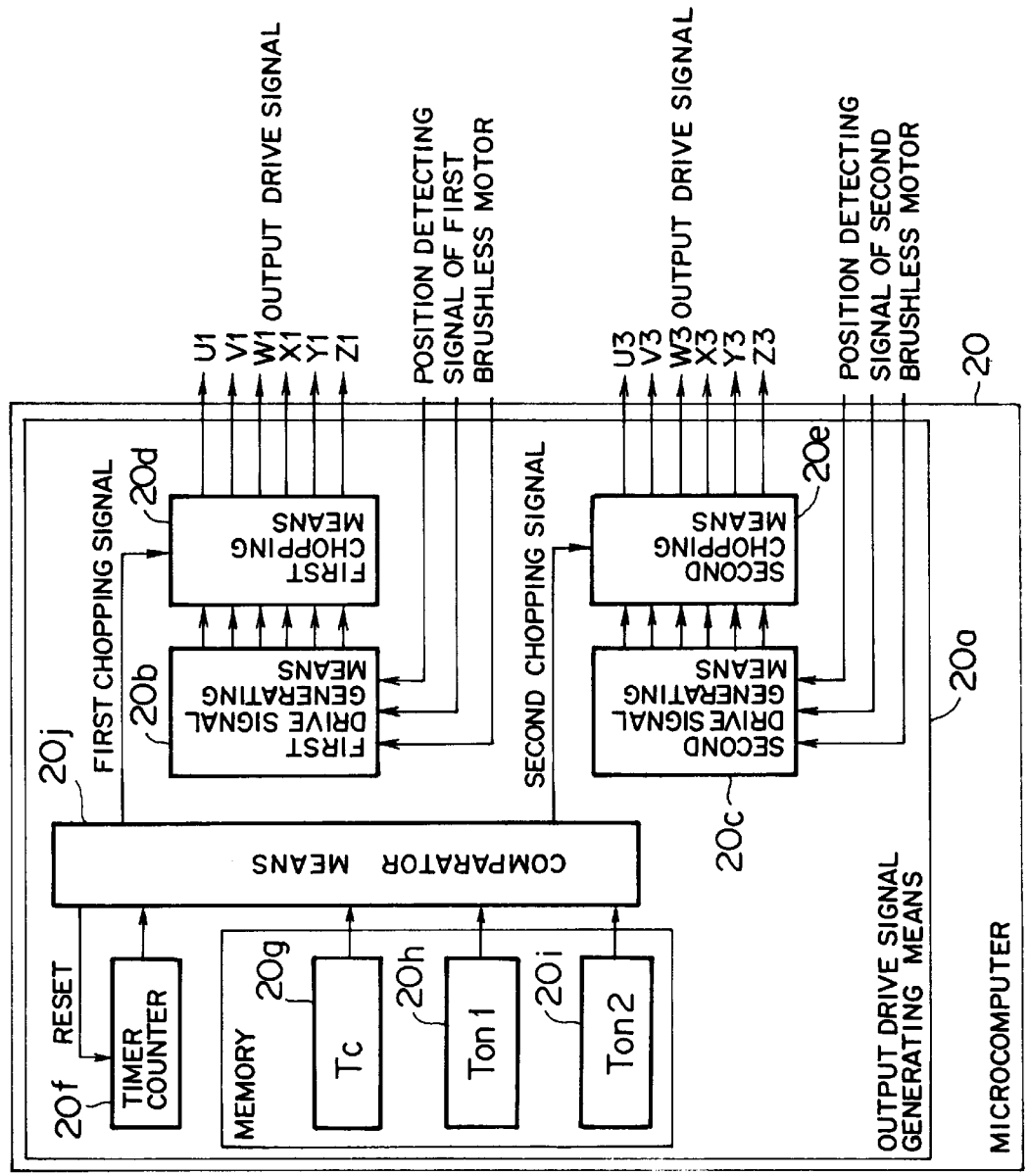
FIG. 4 is a block diagram showing schematic portions of a microcomputer for controlling the air conditioner shown in FIG. 1.
Figure 5:
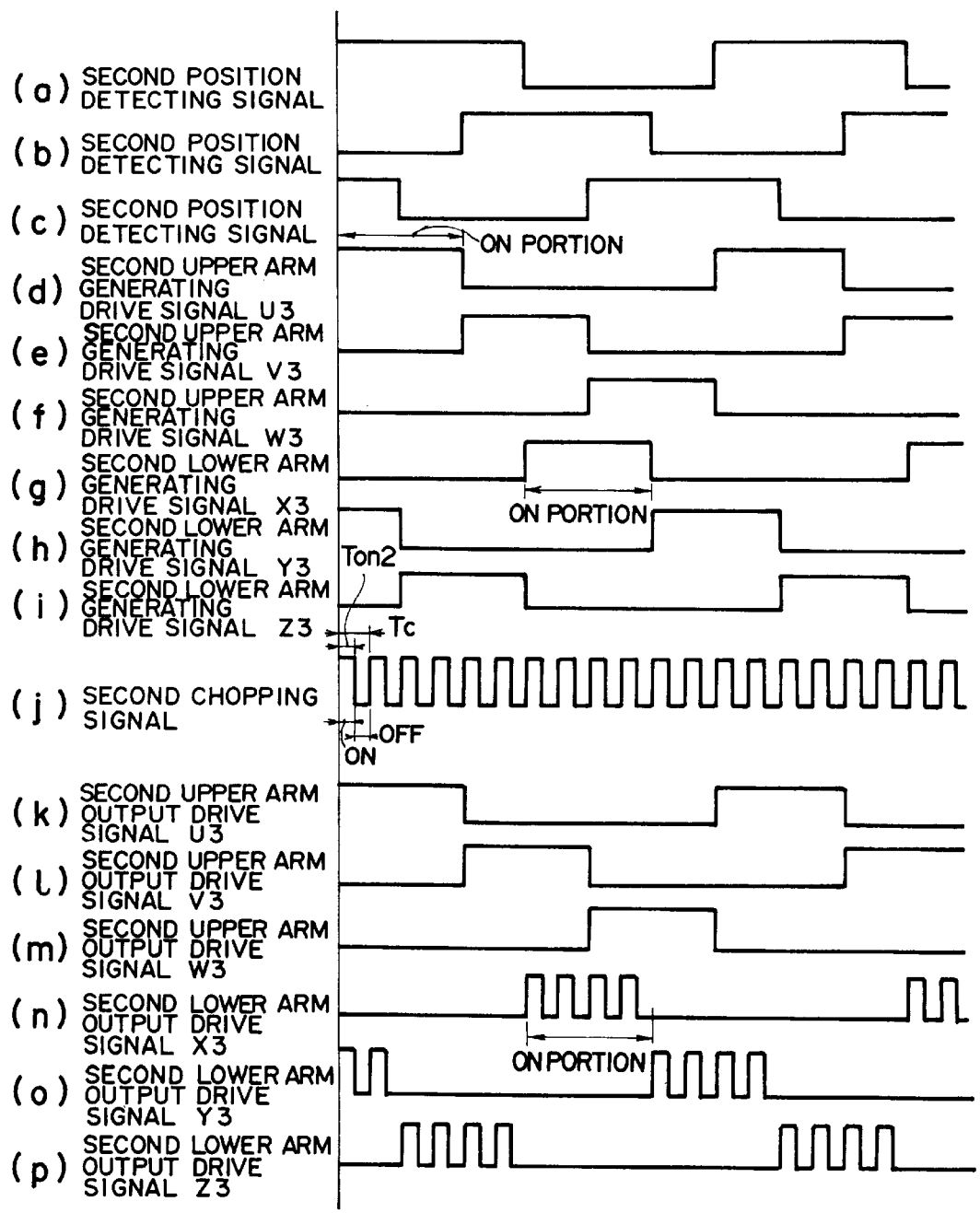
FIG. 5 is a time chart for explaining the operation of the microcomputer shown in FIG. 4.

As shown in FIG. 4, the microcomputer 20 has output drive signal generating means 20a which performs the input/output of an input/output circuit necessary for the control of an air conditioner to control the latter and generates drive signals of the transistors of the first and second drive circuits 5 and 22.

The output drive signal generating means 20a is composed of first and second signal generating means 20b, 20c, first and second chopping means 20d, 20e, a timer counter 20f, memories 20g, 20h, 20i, and comparator means 20j.

The first and second drive signal generating means 20b and 20c input position detecting signals (position detecting signals of the second brushless motor 2 are shown in FIGS. 5(a) to 5(c)) of the first and second brushless motors 1 and 2 to generate drive signals U1, V1, W1, X1, Y1 and Z1 for turning on as desired the transistors U1, V1, W1, X1, Y1 and Z1 and U3, V3, W3, X3, Y3 and Z3 of the first and second drive circuits 5 and 22, respectively, and U3, V3, W3, X3, Y3 and Z3 shown in FIGS. 5(d) to 5(i) so that the first and second brushless motors 1 and 2 are rotated in response to the position detecting signals.

On the other hand, the chopping signal generating means composed of the timer counter 20f, memories 20g, 20h, 20i, and comparator means 20j generates a first chopping signal having a predetermined ratio of on to off at a higher frequency than that of the drive signals generated as described above and a second chopping signal shown in FIG. 5(j). At this time, a period Tc (shown in FIG. 5(j)) of the first and second chopping signals is set to the memory 20g, and predetermined on-times Ton1 and Ton2 (shown in FIG. 5(j)) of the first and second chopping signals are set to the memories 20h and 20i. Then, the timer counter 20f is reset to cause it to start, and at the same time, the first and second chopping signals are set to a H level (on).

Thereafter, in the comparator means 20j, the counted value of the timer counter 20f is compared with the values of the on-times Ton1 and Ton2 of the first and second chopping signals of the memories 20h and 20i. When they coincide, the corresponding chopping signal is set to an L level (off). Thereafter, the counted value of the timer counter 20f is compared with the value of the period Tc of the first and second chopping signals of the memory 20g. When they coincide, the timer counter 20f is reset to cause it to start, and the first and second chopping signals are set to a H level (on). After this, the foregoing processes are repeated, and the first and second chopping signals are generated (the generated chopping signal is shown in FIG. 5(j)).

The first and second chopping means 20d and 20e input the drive signals generated by the first and second drive signal generating means 20b and 20c and input the generated first and second chopping signals. The drive signals for turning on as desired the transistors X1, Y1, Z1 and X3, Y3, Z3 of at least one arm, the lower arms 5b and 22b of the upper arms 5a, 22a or lower arms 5b, 22b of the first and second drive circuits 5 and 22, out of the inputted drive signals, and the on-portions of X3, Y3 and Z3 are subjected to the chopping by the first and second chopping signals (shown in FIGS. 5(n) to 5(p)).

This can be accomplished by taking the logical product or the logical sum, the logical product in this example, of the drive signals X1, Y1, Z1 and X3, Y3, Z3 subjected to the chopping in the first and second chopping means 22d and 22e and the first and second chopping signals. In the case of the second chopping means 20e, the output drive signals X3, Y3, Z3 shown in FIGS. 5(n) to 5(p) assume a H level only when the generated second drive signals X3, Y3, Z3 shown in FIGS. 5(g) to 5(i) are at H level and the generated second chopping signal shown in FIG. 5(j) is at a H level. As the result, the on-portions of the drive signals of the lower arms 5b and 22b of the first and second drive circuits 5 and 22 serve as the first and second chopping signals, respectively.

The first and second drive signals X1, Y1, Z1 and X3, Y3, Z3 (shown in FIGS. 5(n) to 5(p)) in which the on-portions are formed into the first and second chopping signals and other first and second drive signals U1, V1, W1 and U3, V3, W3 (shown in FIGS. 5(k) to 5(m)) are generated by the first and second chopping means 20d and 20e. These generated 12 first and second drive signals are outputted from the microcomputer 20.

Figure 3:
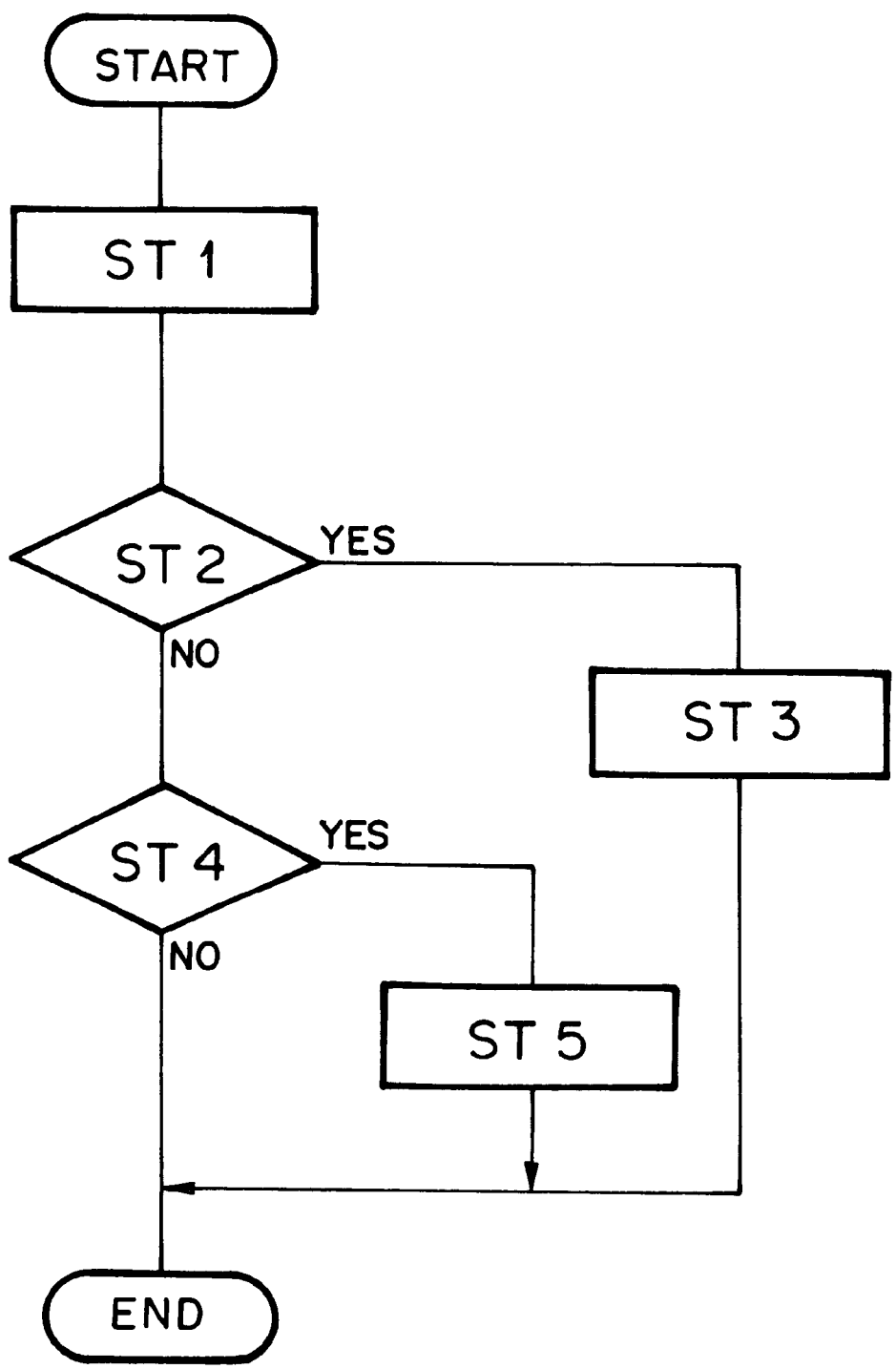
FIG. 3 is a flow chart for explaining a control method for a brushless motor used for the air conditioner shown in FIG. 1.

The microcomputer 20 varies as desired the on-times Ton1 and Ton2 of the first and second chopping signals set to the memories 20h and 20i by the method shown in the flow chart of FIG. 3 to rotation-control the first and second brushless motors 1 and 2 constant at a predetermined number of revolutions. In the case of this embodiment, the period of the first and second chopping signals is the same as the period Tc, and one memory 20g is used to decide the period of the first and second chopping signals. It is to be noted that the period Tc set to the memory 20g may be varied as needed.

Figure 6:
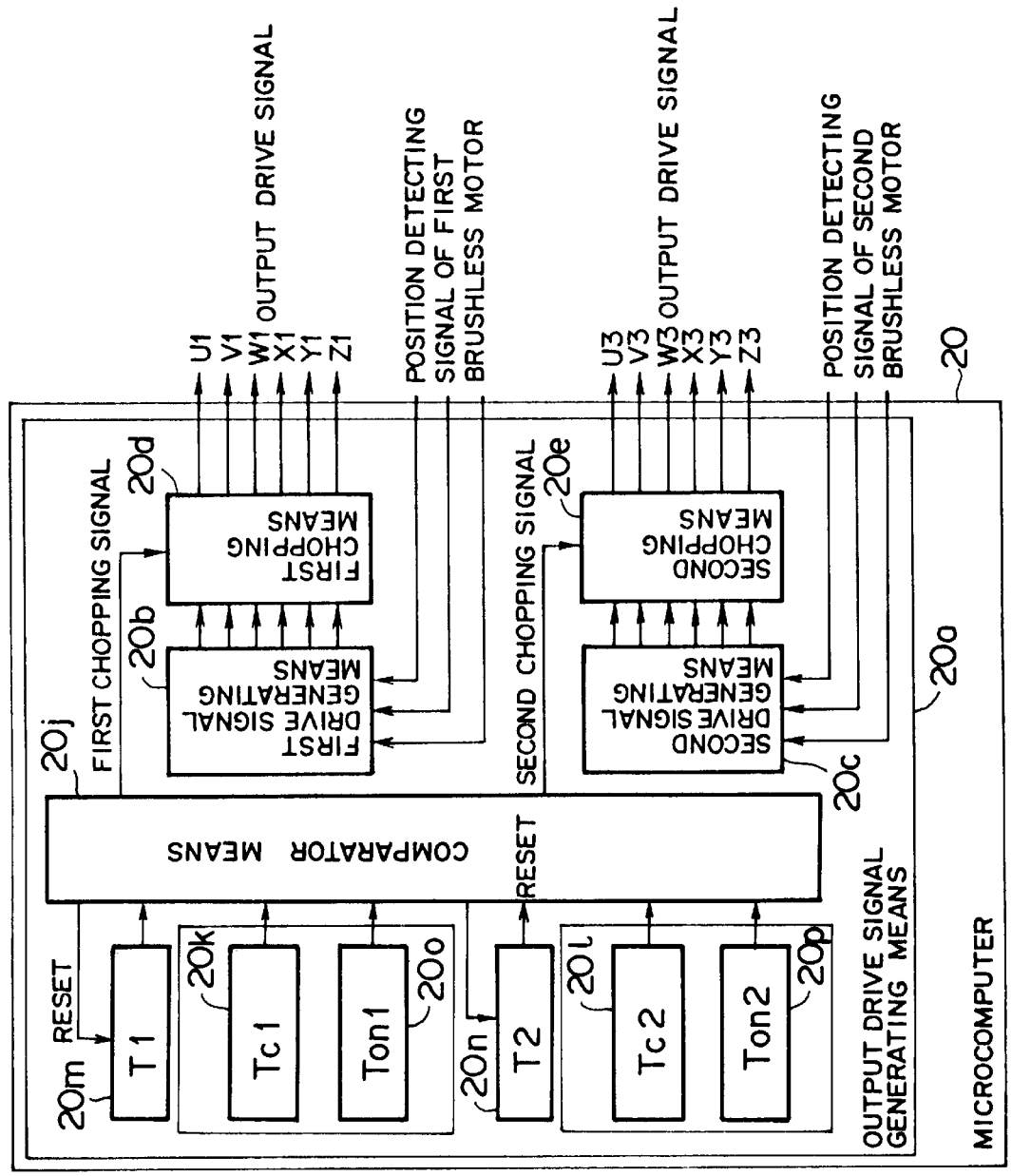
FIG. 6 is a block diagram of schematic portions of a microcomputer for controlling an air conditioner showing a modified embodiment of the present invention.

FIG. 6 is a schematic block diagram of output drive signal generating means 20a of the microcomputer 20 showing a modified example of this embodiment. In FIG. 6, the same parts as and parts corresponding to those shown in FIG. 4 are indicated by the same reference numerals, and a duplicate description is omitted.

In this modified example, in generating the first and second chopping signals, the period of the first chopping signal is Tc1 and the period of the second chopping signal is Tc2, these Tc1 and Tc2 being set to individual memories 20k and 20l. The periods of the chopping signals can be made to be different values by individual timer counters, i.e., a first timer counter (T1) 20m and a second timer counter (T2) 20n. Since different periods of the first and second chopping signals can be applied to the memories 20o and 20p, optimum chopping signals can be generated in the first and second brushless motors 1 and 2.

While in this embodiment, two first and second brushless motor 1 and 2 are controlled in rotation by the first and second drive signals generated by the output drive signal generating means 20a of the microcomputer 20 and outputted from the microcomputer 20, it is to be noted that the mode is not limited thereto but more than two brushless motors may be controlled in rotation in a similar manner. In this case, the number of drive signal generating means constituting the output drive signal generating means 20a, chopping means and chopping signal generating means (timer counter, memory and comparator means) may be increased as needed.

A second embodiment of the present invention will be described hereinafter with reference to FIGS. 7 to 10. In these drawings, the same parts as and parts corresponding to those shown in FIG. 12 are indicated by the same reference numerals and a duplicate description will be omitted.

Figure 7:
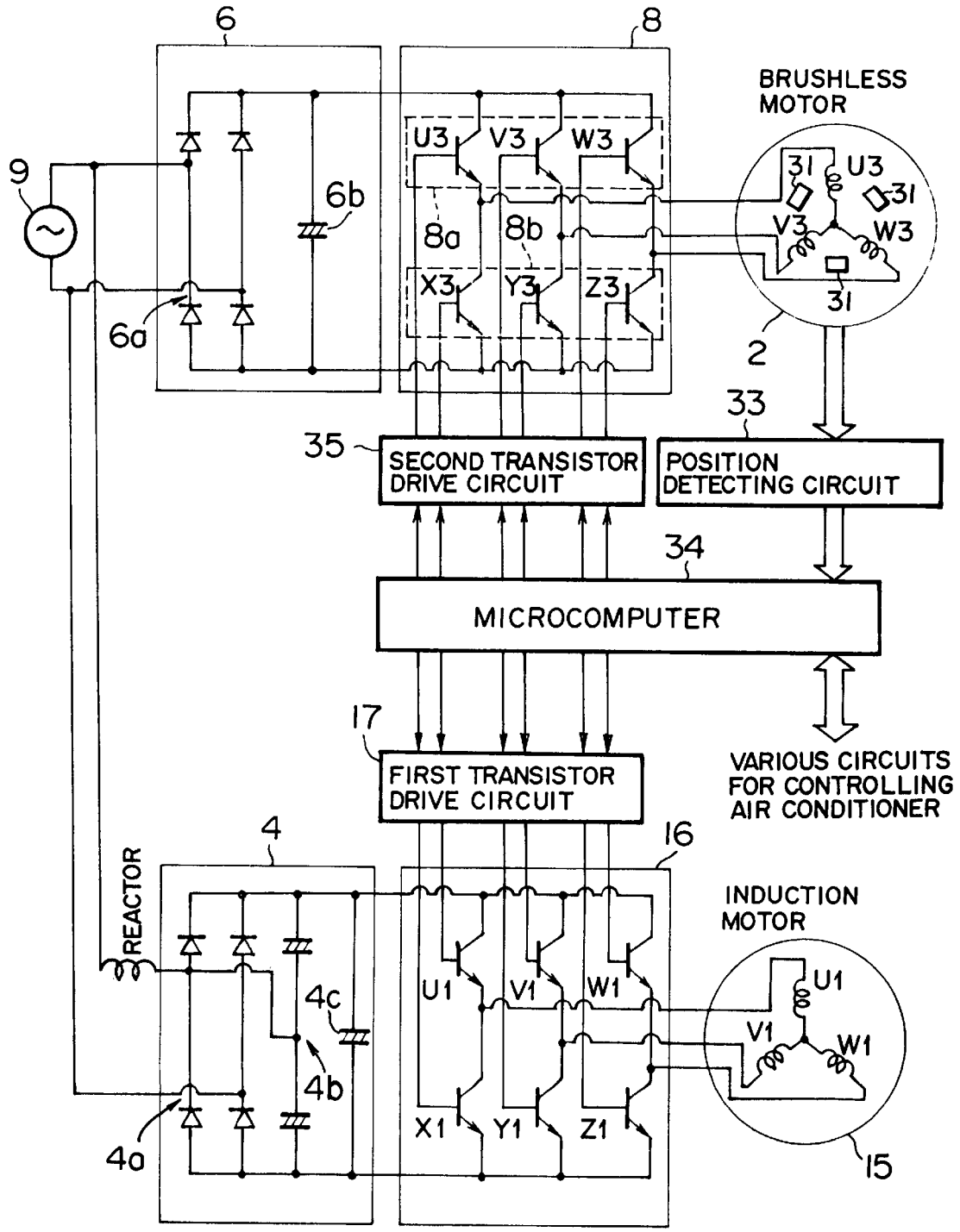
FIG. 7 is a schematic block diagram of a control circuit for an air conditioner showing a second embodiment of the present invention.
Figure 8:
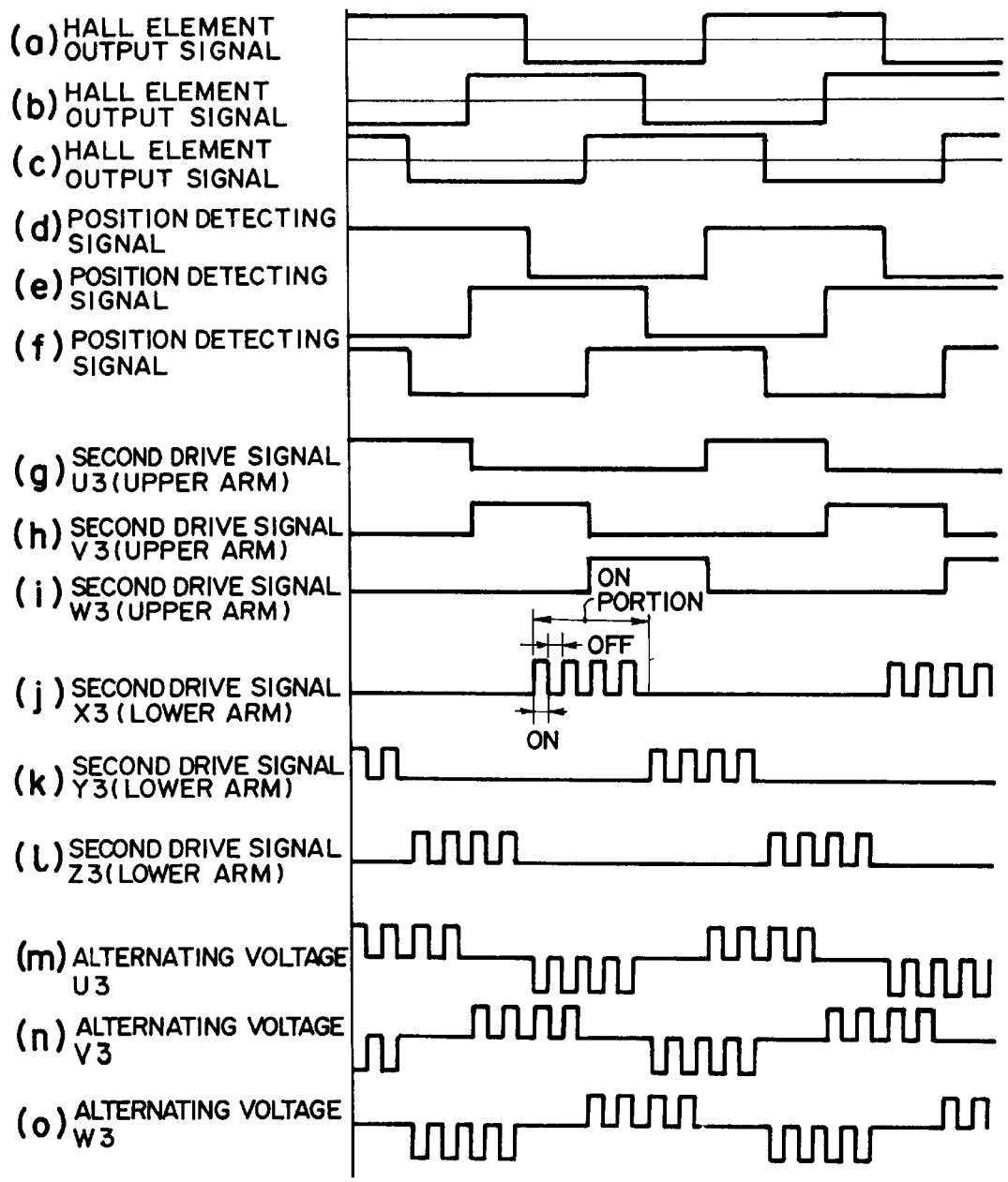
FIG. 8 is a time chart for explaining the operation of a control circuit for the air conditioner shown in FIG. 7.

In FIG. 7, a control circuit for an air conditioner comprises an induction motor 15 for a compressor, a brushless motor 2 for a blower (for example, outdoor) or exhaust blower, a first power circuit 4, a first drive circuit 16, a first transistor drive circuit 17, a second power circuit 6, a second drive circuit 8, a position detecting sensor (for example, a hall element) 31, a position detecting circuit 33, a microcomputer 34 and a second transistor drive circuit 35.

In the case of this example, the first power circuit 4 inputs an AC power 9 through a reactor and outputs a predetermined DC voltage. This DC voltage is inputted to the first drive circuit 16 as the first drive means in which six transistors U1, X1, V1, Y1, W1, Y1 and Z1 as a plurality of switches are connected in three-phase bridge, and converted into a three-phase AC voltage, which is then applied to three-phase windings U1, V1 and W1 of the three-phase induction motor 15. The second power circuit 6 is provided with a commutation circuit 6a for converting an input AC power 9 into a DC power and a smoothing condenser 6b, etc. A predetermined DC voltage outputted from the second power circuit 6 as said DC power is inputted into the second drive circuit 8 as second drive means composed of six transistors U3, V3, W3, X3, Y3 and Z3 as a plurality of switches connected in a three-phase bridge, and converted into a three-phase AC voltage, which is then applied to three-phase windings U3, V3 and W3 of the three-phase brushless motor for driving the blower. The second drive circuit 8 is composed of an upper arm 10a comprising three transistors U3, V3 and W3 as a plurality of switches for switching the connection between a positive terminal of the second power circuit as the DC power and the three-phase windings U3, V3 and W3 as a plurality of windings of the brushless motor 2, and a lower arm 10b comprising three transistors X3, U3 and Z3 as a plurality of switches for switching the connection between a negative terminal of the second power circuit 6 as the DC power and the three-phase windings U3, V3 and W3 as a plurality of windings of the brushless motor 2.

The position detecting means of the brushless motor 2 comprises a position sensor (a hall element) 31 within the brushless motor 2 for detecting a position of a rotor of the brushless motor 2 for a blower, and a position detecting circuit 33 constituted by comparator means and amplifying means inputting output signals (shown in FIGS. 8(a) to 8(c)) of the position detecting sensor 31 and outputting position detecting signals (shown in FIGS. 8(d) to 8(f)).

The microcomputer 34 performs the input/output with respect to various circuits necessary for at least the outdoor, exhaust for example, of the air conditioner to control the outdoor, exhaust and outputs PMW signals U1, X1, V1, Y1, W1 and Z1 as first drive signals to the first transistor circuit 17 on the basis of the intersection between the modulated waves and fundamental waves U1, V1 and W1 having a predetermined crest value and a predetermined frequency in a manner similar to that of prior art. The first transistor drive circuit 17 turns on/off the transistors U1, X1, V1, Y1, W1 and Z1 of the first drive circuit 16 on the basis of the inputted first drive signal, and converts a DC voltage from the first power circuit 4 inputted into the first drive circuit 16 into three-phase AC voltages U1, V1 and W1 having a predetermined voltage and a predetermined frequency, which are applied to three-phase windings U1, V1 and W1 of the induction motor 15 to rotation-control the induction motor 15 at a predetermined number of revolutions. Simultaneously therewith, the microcomputer 34 inputs the position detecting signals to turn on as desired the transistors U3, V3, W3, X3, Y3 and Z3 of the second drive circuit 6 so that the brushless motor 2 is rotated in response to the position detecting signals to switch the connection between the positive terminal and negative terminal of the second power ciruit 6 and the three-phase windings U3, V3 and W3 of the brushless motor 2.

Second drive signals for conversion of a DC voltage caused by the second power circuit 6 into an AC voltage and application thereof are generated in the three-phase windings U3, V3 and W3. On-portions of drive signals X3, Y3 and Z3 (shown in FIGS. 8(j) to 8(i)) for turning on as desired the transistors X3, Y3 and Z3 of at least one arm, for example, the lower arm 8b, of the upper arm 8a or the lower arm 8b of the second drive circuit 8 out of the second drive signals are formed into chopping signals having a predetermined ratio of on to off for turning on/off as desired the transistors X3, Y3 and Z3 at a higher frequency than that of the drive signals, and the drive signals X3, Y3 and Z3 of the lower arm 8b as the drive signals in which the on-portions are formed into the chopping signals and the drive signals U3, V3 and W3 (shown in FIGS. 8(g) to 8(i)) of the upper arm 8a as other drive signals are outputted as the second drive signals for driving the transistors U3, V3, W3, X3, Y3 and Z3 of the second drive circuit 8 to the second transistor drive circuit 35.

The second transistor drive circuit 35 turns on as desired the transistors U3, V3, W3, X3, Y3 and Z3 of the second drive circuit 8 in accordance with the second drive signals inputted, and simultaneously therewith, chopping-drives the transistors X3, Y3 and Z3 in accordance with the chopping signals when the transistors X3, Y3 and Z3 of the lower arm 8b which is at least one arm of the upper arm 8a and the lower arm 8b of the second drive circuit 8 so that when a DC voltage from the second power circuit 6 is converted into a three-phase AC voltage, the three-phase AC voltage subjected to chopping and conversion is formed into a predetermined voltage. Three-phase AC voltages U3, V3 and W3 (shown in FIGS. 8(m) to 8(o)) of said predetermined voltage are applied to the three-phase windings U3, V3 and W3 of the brushless motor 2 to rotation-control the brushless motor 2.

The number of revolutions of the brushless motor 2 can be calculated in the steps similar to those shown in FIG. 3 of the first embodiment. Although the detailed description is omitted, the brushless motor 2 can be controlled in rotation constant at a predetermined number of revolutions by the repetition of the Steps ST1 and ST5.

Figure 9:
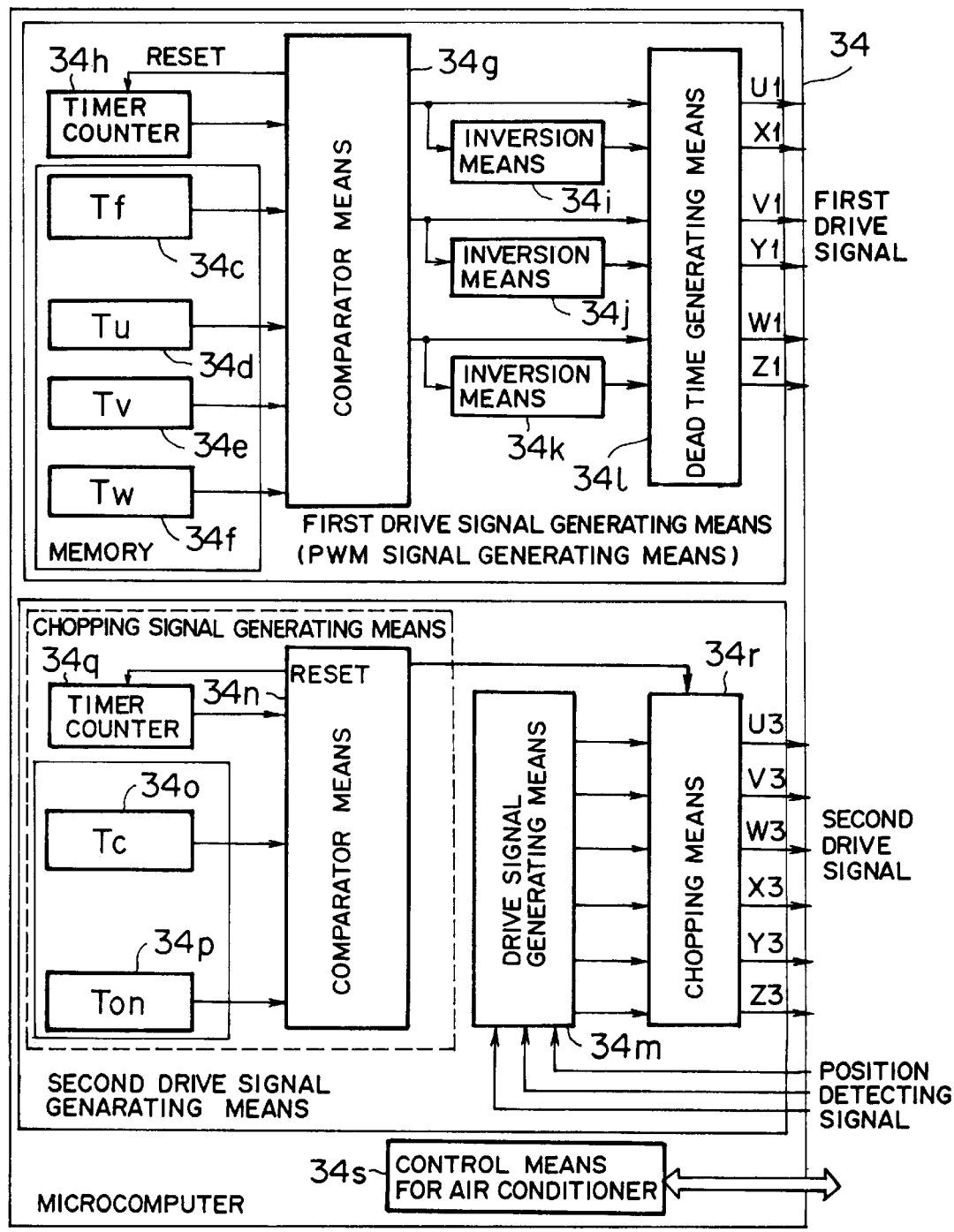
FIG. 9 is a schematic partial block diagram of a microcomputer of a control circuit for the air conditioner shown in FIG. 7.
Figure 10:
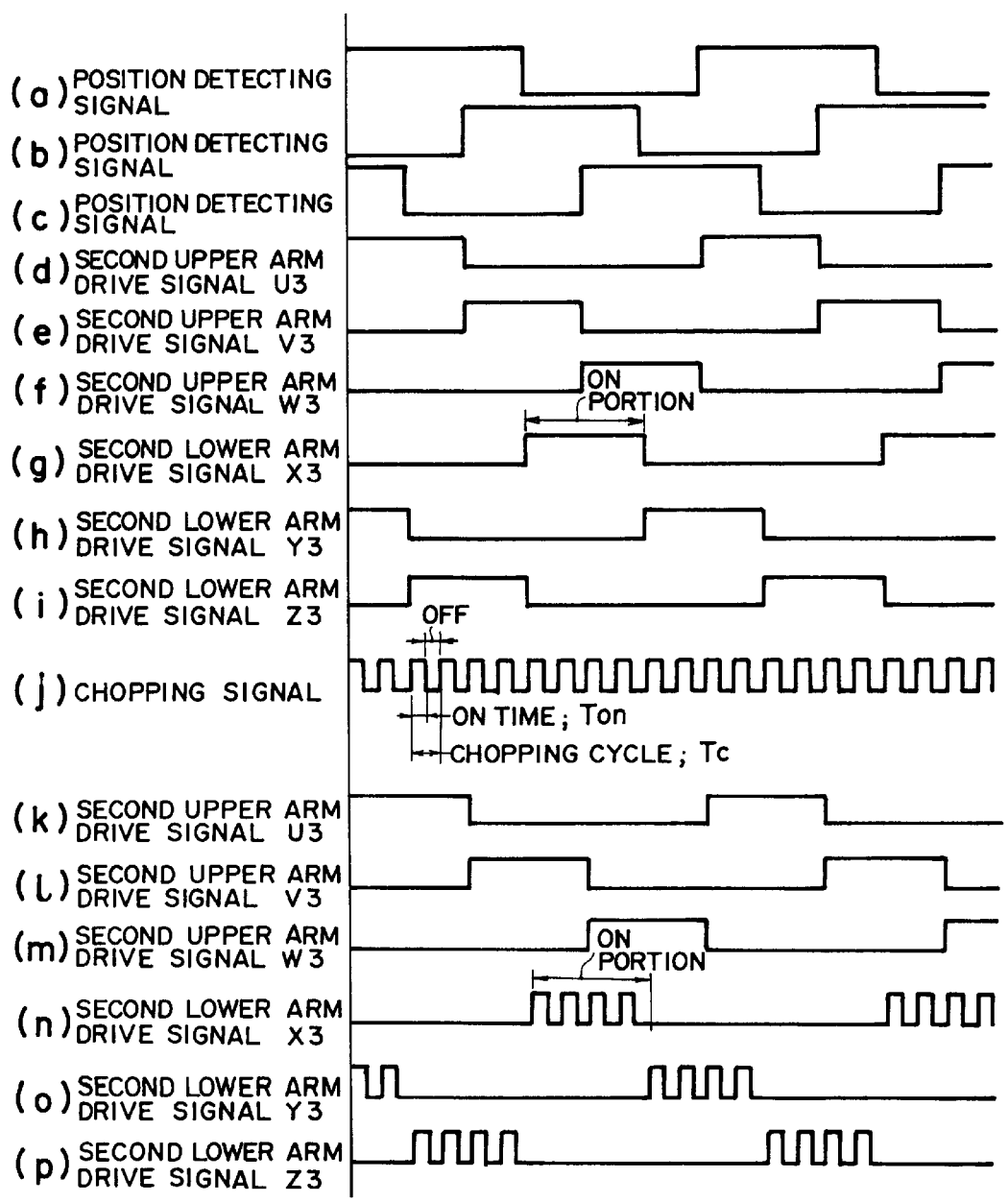
FIG. 10 is a time chart for explaining the operation of the microcomputer shown in FIG. 9.
Figure 13:
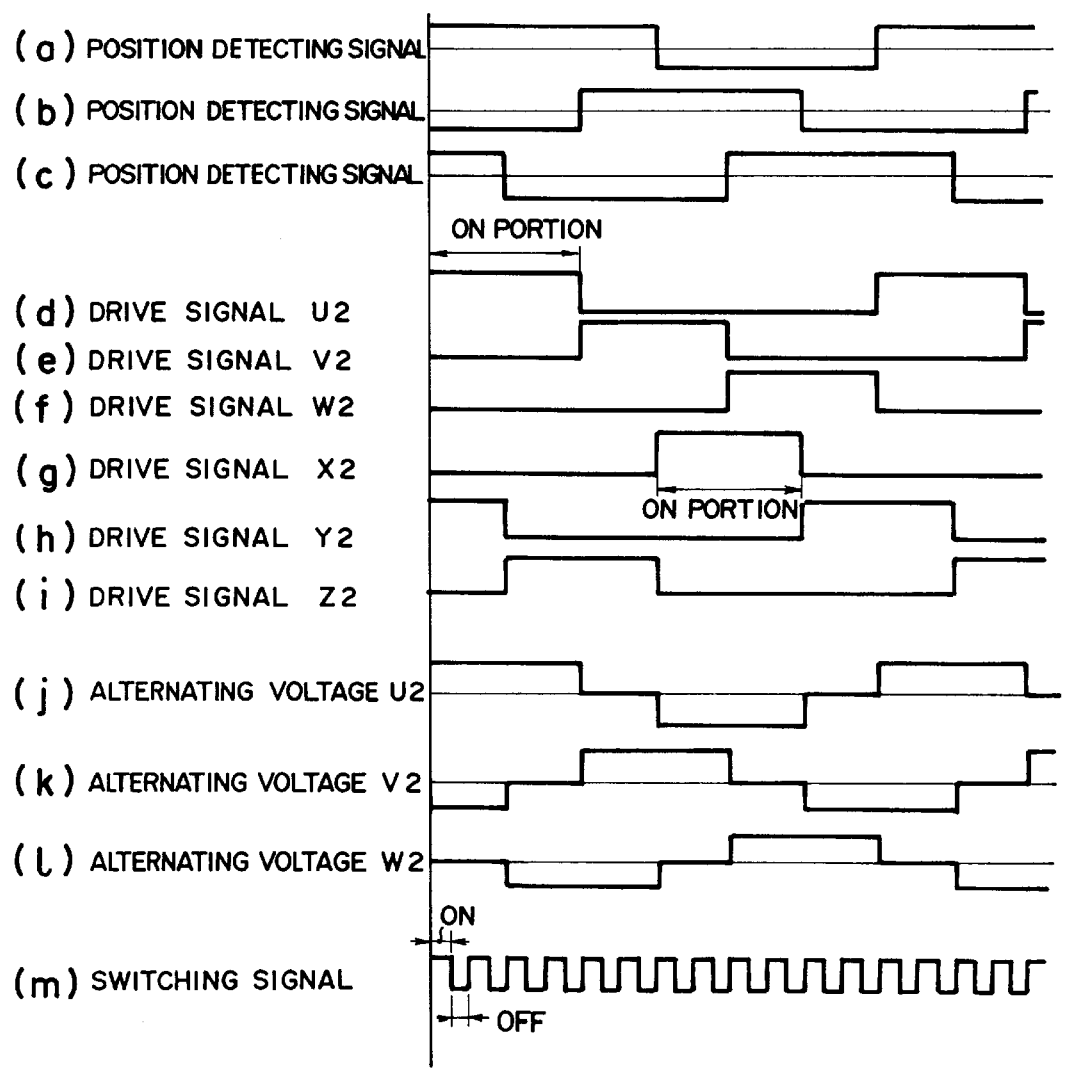
FIG. 13 is a time chart for explaining a control method for a brushless motor used for the air conditioner shown in FIG. 11.
Figure 14:
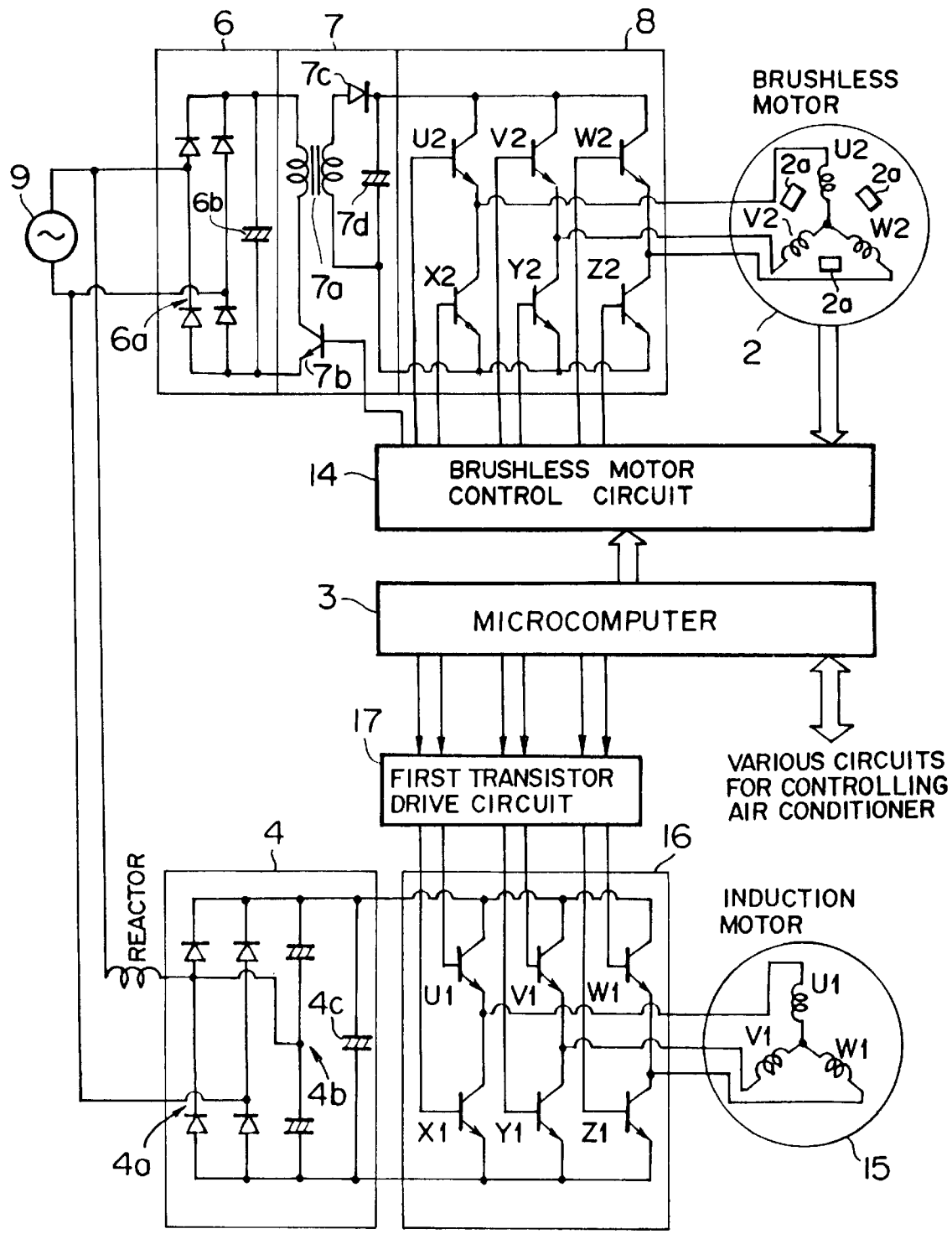
FIG. 14 is a schematic block diagram of a control cirucit for a second conventional air conditioner.

For example, as shown in FIG. 9, the microcomputer 34 is interiorly provided with control means 34s of an air conditioner for performing the input/output with respect to various circuits necessary for the control of the air conditioner to control the latter, first drive signal generating means 34a for generating a first drive signal for rotation-controlling the induction motor 15, and second drive signal generating means 34b for generating a second drive signal for rotation-controlling the brushless motor 2.

The first drive signal generating means 34a has a timer, which in this case comprises PMW signal generating means (see FIGS. 15(b) to 15(g)) for generating, as first drive signals U3, X3, V3, Y3, W3 and Z3, six PWM signals for turning on/off as desired six transistors U1, X1, V1, Y1, W1 and Z1 of the first drive circuit 5 for rotation-controlling the three-phase induction motor 15. The microcomputer 34 obtains intersections between the modulated waves and the fundamental waves U1, V1 and W1 at a half-period Tf (see FIG. 15(a)) to set Tu1, Tv1 and Tw1 up to the respective intersections to 14d, 14e and 14f. Then, the microcomputer 34 sets the half-period Tf of the modulated wave to the memory 34c and sets the obtained values Tu1, Tv1 and Tw1 to the memories 34d, 34e and 34f.

The timer counter 34h is reset to cause it to start, and simultaneously therewith, three signals U1, V1 and W1 outputted from the comparator means 34g take a L level. In the comparator means 34g, the counted value of the timer counter 34h is compared with the values Tu1, Tv1 and Tw1 of the memories 34d, 34e and 34f. When they coincide, the respective output signals are inverted. When the counted value of the timer counter coincides with the value of the memory 34c at the half-period Tf of the modulated wave, the comparator means 34g resets the timer counter 34h, during which within the microcomputer 34, the intersections between the modulated waves at the next half-period of the modulated wave and the fundamental waves U1, V1 and W1. From that intersection, Tu1, Tv1 and Tw1 are newly obtained. The microcomputer 34 again rests the newly obtained values Tu1, Tv1 and Tw1 to the memories 34d, 34e and 34f simultaneously with the reset of the timer counter 34h to re-start the timer counter 34h. The above-described processes are thereafter repeated in the similar manner, and PWM signal of U1, V1 and W1 shown in FIGS. 15(b), 15(d) and 15(f) are outputted from the comparator means 34g.

Figure 15:
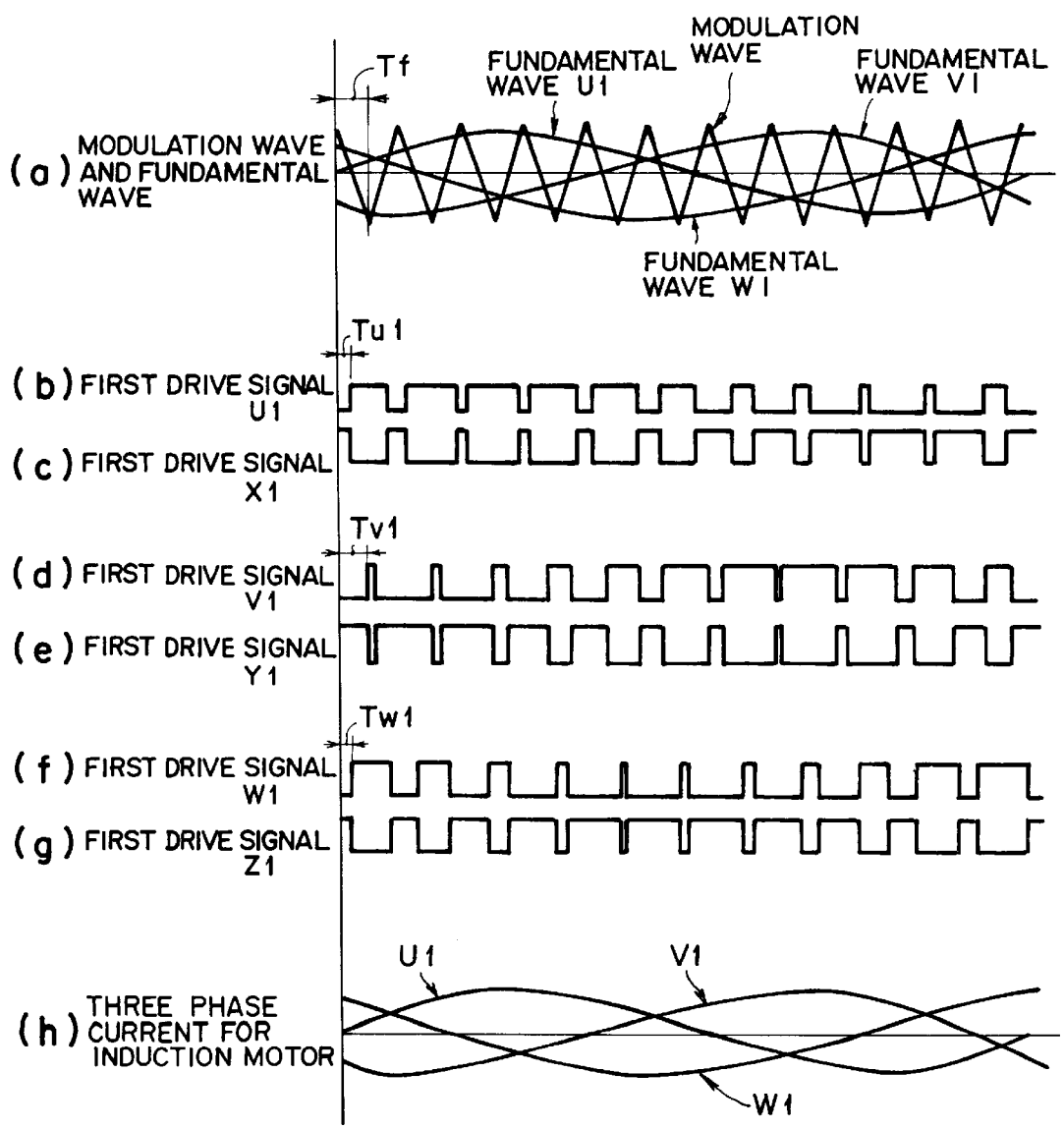
FIG. 15 is a time chart for explaining the operation of a control circuit for the air conditioner shown in FIG. 14.

The three PWM signals U1, V1 and W1 are respectively inverted by inversion means 34i, 34j and 34k and formed into PMW signals X1, Y1 and Z1 shown in FIGS. 15(c), 15(e) and 15(g). These inverted PWM signals X1, Y1 and Z1 and non-inverted signals U1, V1 and W1 are inputted into dead time generating means 341. The dead time generating means 341 is delay means, which in order to prevent two same-phase transistors (U1 and X1, V1 and Y1, and W1 and Z1) of the first drive circuit 16 from being simultaneously turned on to short-circuit the power, outputs, for example PWM signals U1, X1, V1, Y1, W1 and Z1, are inputted with a rise thereof delayed a predetermined time to prevent the two same-phase transistors from simultaneously taking a H level (on). In this manner, six PWM signals U1, X1, V1, Y1, W1 and Z1 as the first drive signals are generated from the first drive signal generating means 34a and outputted from the microcomputer 34.

At the same time, the microcomputer 34 varies, in order to impart a predetermined number of revolutions to the induction motor 15, the fundamental waves U1, V1 and W1 to a predetermined crest value and a predetermined frequency in accordance with said predetermined number of revolutions to thereby render the intersection between the modulated wave and the fundamental wave variable, whereby the values Tu1, Tv1 and Tw1 set to the memories 34d, 34e and 34f are made variable, and the pulse widths (on/off timing) of six PWM signals are made variable and outputted to vary the number of revolutions of the induction motor 15 to rotation-control the latter at a predetermined number of revolutions. It is to be noted that the half-period Tf of the modulated wave set to the memory 34c may be made variable as needed.

On the other hand, the second drive signal generating means 34b inputs position detecting signals (shown in FIGS. 10(a) to 10(c)) from the position detecting circuit 33 in the drive signal generating means 34m and generates second drive signals U3, V3, W3, X3, Y3 and Z3 shown in FIGS. 10(d) to 10(i) for turning on as desired transistors U3, V3, W3, X3, Y3 and Z3 of the second drive circuit 8 so that the brushless motor 2 is rotated in response to said position detecting signals. The chopping signal generating means composed of the timer counter 34q, memories 34o and 34p and comparator means 34n generates a chopping signal shown in FIG. 10(j) having a predetermined ratio of on to off at a higher frequency than that of the generated second drive signal. By the microcomputer 34, a period Tc of a chopping signal and on-time Ton are set to the memories 34o and 34p, and a timer counter 34q is reset to cause it to start, simultaneously therewith an output chopping signal being allowed to assume a H level (on). Thereafter, by the comparator means 34n, the counted value of the timer counter 34q is compared with the on-time Ton of the chopping signal of the memory 34p. When they coincide, the output chopping signal is allowed to assume an L level (on). Thereafter, the counted value of the timer counter 34q is compared with the period Tc of the chopping signal of the memory 34o by the comparator means 34n. When they coincide, the timer counter 34q is reset to cause it to re-start, simultaneously therewith an output chopping signal being allowed to assume a H level (on). The above-described processes are thereafter repeated in the similar manner, and a chopping signal shown in FIG. 10(j) is generated from the chopping signal generating means.

The chopping means 34r inputs the generated second drive signal and the chopping signal, and subjects the on-portions of the drive signals X3, Y3 and Z3 for turning on as desired the transistors X3, Y3 and Z3 of one arm, for example, the lower arm 8b of the upper arm 8a or the lower arm 8b of the second drive cicruit 8 out of the second signals to chopping by said chopping signal as shown in FIGS. 10(n) to 10(p). This can be carried out by taking the logical product or logical sum, for example, logical product of the drive signals X3, Y3 and Z3 subjected to chopping and the chopping signal. The drive signals X3, Y3 and Z3 to be outputted shown in FIGS. 10(n) to 10(p) are at a H level only when the generated drive signals X3, Y3 and Z3 shown in FIGS. 10(g) to 10(i) are at a H level and the chopping signal shown in FIG. 10(j) is at a H level. As the result, the on-portions of the drive signals X3, Y3 and Z3 are chopping signals.

The drive signals X3, Y3 and Z3 (shown in FIGS. 10(n) to 10(p)) in which the on-portions are chopping signals and other drive signals U3, V3 and W3 (shown in FIGS. 10(k) to 10(m)) are outputted as second drive signals from the microcomputer 34. At this time, the microcomputer 34 varies as desired the on-time Ton of the chopping signal set to the memory 34p, varies the ratio of on to off of the chopping of the on-portions of the second drive signals X3, Y3 and Z3 and varies the number of revolutions of the brushless motor 2 to rotation-control the brushless motor 2 at a predetermined number of revolutions. It is to be noted that the period Tc of the chopping signal set to the memory 34p may be varied as needed.

Further, while in the above one example of the microcomputer 34, the first drive signals for rotation-controlling the induction motor 15 and the second drive signals for rotation-controlling the brushless motor 2 are respectively outputted by a set, it is to be noted that the mode is not limited thereto but more than one set will suffice, and plural sets of first drive signals or plural sets of second drive signals for rotation-controlling a plurality of induction motors 15 or a plurality of brushless motors 2, respectively, may be outputted.

In this case, the number of the timer counters 34h and memories 34c, 34d, 34e and 34f constituting the first drive signal generating means 34a, the comparator means 34g, inversion means 34i, 34j, 34k, and the dead time generating means 34l, and that of the drive signal generating means 34m constituting the second drive signal generating means 34b, the timer counter 34q of the chopping signal generating means, the memories 34o and 34p, the comparator means 34n and the chopping means 34r may be increased as needed.

We claim:

1. A motor control device comprising: a plurality of motors for driving respective loads; a microcomputer for controlling the plurality of motors; position detecting means for detecting a respective position of a rotor of each of the motors and outputting a respective position signal dependent thereon; drive means for individually driving each of the motors, each drive means including switch means for switching a connection between a DC power supply and a respective motor; drive signal generating means for generating respective drive signals for individually driving the respective motors in response to corresponding position signals for each motor inputted from the position detecting means to the microcomputer, whereby the respective drive signals are effective to selectively drive the switch means of the respective drive means so that rotors of respective motors are rotated in response to corresponding position signals, the connection between the DC power supply and the respective motors is switched so that a DC voltage from the DC power supply is converted into an AC voltage, which is applied to rotate rotors of the motors; chopping signal generating means for generating chopping signals each having a predetermined period for combining with respective drive signals for selectively driving switch means of the respective drive means, the chopping signals having a higher frequency than that of the drive signals; wherein respective chopping signals and drive signals are output by the microcomputer to the respective drive means to convert the DC voltage to an AC voltage and to effect voltage chopping, and the chopped AC voltage is applied to respective motors to control the rotation frequency of rotors of the motors.

2. A motor control device according to claim 1; wherein the microcomputer includes means for calculating a number of revolutions of a rotor of a respective motor dependent on a corresponding position signal, and means for varying the period of a corresponding chopping signal so that the number of revolutions of the rotor is made equal to a predetermined number of revolutions.

3. A motor control device according to claim 2; wherein the chopping means includes means for determining a logical sum of a respective generated drive signal and a corresponding respective generated chopping signal for combining respective drive signals and respective chopping signals to subject respective generated drive signals to chopping.

4. A motor control device according to claim 1; wherein at least one of the plurality of motors is an induction motor and at least another of the plurality of motors is a brushless motor, one of the induction motor and the brushless motor for driving a compressor of an air conditioning system and the other for driving a blower of an air conditioning system.

5. A motor control device according to claim 4; wherein the microcomputer includes the drive signal generating means comprising first drive signal generating means for generating the drive signal for controlling the driving means of the at least one induction motor, and second drive signal generating means for generating the drive signal for controlling the driving means of the at least one brushless motor, the first drive signal generating means comprising PWM signal generating means for generating a plurality of PWM signals for selectively driving a switch means of the first drive means for controlling the induction motor by controlling the period of the PWM signals, and the second drive signal generating means comprising drive signal generating means for generating drive signals for selectively driving switch means of the second drive means in response to the position signal for controlling the brushless motor, signal generating means for generating chopping signals having a predetermined frequency higher than that of the second drive signal and generating the timing of the chopping signals by a timer, and chopping means for chopping the drive signals for selectively driving the switch means of the driving means of the brushless motor.

6. A motor control device according to claim 1; wherein the microcomputer comprises the drive signal generating means for generating the driving signals for selectively actuating the switch means of the respective driving means so that rotors of each respective motor are rotated in response to corresponding position signals, the chopping signal generating means for generating respective chopping signals having a predetermined frequency higher than that of corresponding drive signals, and chopping means for chopping the drive signals dependent on the chopping signals for selectively driving the switch means of the respective drive means.

7. A control device for controlling a blower motor and a condenser motor of an air conditioner, comprising: a plurality of power circuits each for supplying a corresponding DC voltage; a plurality of motor driving circuits each having switch means for supplying the DC voltage from a corresponding power circuit as an AC voltage to respective windings of a condenser motor and a blower motor of an air conditioner; a plurality of position detecting means each for detecting a rotational position of a rotor of a respective one of the condenser motor and the blower motor and generating a respective position signal dependent thereon; a plurality of switch driving circuits each receptive of a corresponding one of a plurality of driving signals for selectively driving the switch means of each corresponding motor driving circuit; and a single controlling means for controlling the rotation of each of the condenser motor and the blower motor by generating the plurality of driving signals each being dependent on the respective position signals to drive the switch means of each corresponding motor driving circuit so that the DC voltage from each corresponding power circuit is converted and supplied as the AC voltage to the respective windings depending on the rotational position of the condenser motor and the blower motor.

8. A control device according to claim 7; wherein each power circuit has a positive DC terminal and a negative DC terminal; and wherein the switch means of each motor driving circuit comprises an upper arm comprising a plurality of switches for switching a connection between the positive DC terminal of a corresponding power circuit and the respective windings of the condenser motor and the blower motor, and a lower arm comprising a plurality of switches for switching a connection between the negative DC terminal of the corresponding power circuit and the respective windings of the condenser motor and the blower motor.

9. A control device according to claim 8; wherein the single controlling means includes chopping signal generating means for generating a chopping signal for controlling each switch driving circuit so that the DC voltage from each corresponding power circuit is converted and simultaneously chopped to a predetermined AC voltage supplied to the respective windings of the condenser motor and the blower motor.

10. A control device according to claim 9; wherein the single controlling means includes means for calculating a number of revolutions of the rotor of each of the motors in accordance with each respective position signal, means for comparing the respective calculated number of revolutions of a respective motor with a predetermined number of revolutions, and means for controlling the chopping signal generating means so that the chopping signal is effective to control the rotation frequency of respective motors so that the number of revolutions of respective rotors is equal to the predetermined number of revolutions.

11. A control device according to claim 7; wherein at least one of the condenser motor and the blower motor is an induction motor.

12. A control device for controlling a plurality of motors according to claim 7; wherein at least one of the plurality of motors is a brushless motor.

13. A control device for an air conditioner according to claim 6; wherein the chopping means combines respective chopping signals with respective drive signals by taking a logical product of a respective generated drive signal and a respective generated chopping signal to subject the generated drive signals to chopping.

14. A motor control device for controlling a plurality of motors, comprising: frequency detecting means for detecting the frequency of each of a plurality of motors; a plurality of driving means each comprising an input terminal receptive of an input voltage from a power source, an output terminal connected to a respective motor, and switch means receptive of driving signals for selectively driving each respective motor; and driving signal generating means for generating driving signals for each respective motor in accordance with the detected frequency of the respective motors.

15. A motor control device according to claim 14; wherein the input voltage is a DC voltage and the switch means of selected ones of the driving means includes means for converting the DC input voltage to an AC voltage in accordance with corresponding driving signals for application to corresponding AC motors.

16. A motor control device according to claim 14; wherein selected ones of the driving means include means for chopping the AC voltage to control the frequency of respective motors.

17. A motor control device according to claim 14; wherein the frequency detecting means comprises means for determining a position of a rotor of a respective motor and calculating the frequency in accordance therewith.

* * * * *